United States Patent
Chen et al.

(10) Patent No.: US 11,485,091 B2
(45) Date of Patent: Nov. 1, 2022

(54) AUTOMATIC REUSABLE SUPPORT FOR 3D PRINTING

(71) Applicant: UNIVERSITY OF SOUTHERN CALIFORNIA, Los Angeles, CA (US)

(72) Inventors: Yong Chen, Los Angeles, CA (US); Yang Xu, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 192 days.

(21) Appl. No.: 16/615,213

(22) PCT Filed: Jun. 1, 2018

(86) PCT No.: PCT/US2018/035673
§ 371 (c)(1),
(2) Date: Nov. 20, 2019

(87) PCT Pub. No.: WO2018/223043
PCT Pub. Date: Dec. 6, 2018

(65) Prior Publication Data
US 2021/0283856 A1 Sep. 16, 2021

Related U.S. Application Data

(60) Provisional application No. 62/514,698, filed on Jun. 2, 2017.

(51) Int. Cl.
*B29C 64/40* (2017.01)
*B33Y 10/00* (2015.01)
(Continued)

(52) U.S. Cl.
CPC ............ *B29C 64/40* (2017.08); *B29C 64/124* (2017.08); *B29C 64/393* (2017.08); *B33Y 10/00* (2014.12); *B33Y 30/00* (2014.12); *B33Y 50/02* (2014.12)

(58) Field of Classification Search
CPC ..... B29C 64/40; B29C 64/124; B29C 64/393; B33Y 10/00; B33Y 30/00; B33Y 50/02
See application file for complete search history.

(56) References Cited

U.S. PATENT DOCUMENTS 5,484,314 A   1/1996   Farnworth
6,202,999 B1  3/2001   Wayman et al.
(Continued)

OTHER PUBLICATIONS

Hongyao et al, Research on the flexible support platform for fused deposition modeling, The International Journal of Advanced Manufacturing Technology vol. 97, pp. 3205-3221 (May 23, 2018) (Year: 2018).*

(Continued)

*Primary Examiner* — Yung-Sheng M Tsui
(74) *Attorney, Agent, or Firm* — Snell & Wilmer LLP

(57) ABSTRACT

Methods and systems for additively manufacturing an object having an overhang feature. The system includes an array of platform segments forming a deposition surface. The system includes a plurality of elongated beams each connected to a platform segment. The system includes a moving platform configured to attach to a portion of the plurality of elongated beams and elevate the attached elongated beams. The system includes an additive manufacturing device configured to deposit material onto the deposition surface. The system includes an actuator configured to move the moving platform vertically. The system includes a controller configured to cause the additive manufacturing device to deposit the material onto the deposition surface and cause the actuator to move the moving platform upward to cause the elongated beams and their respective connected platform segments to form a support structure for the overhang when the overhang is fabricated by the additive manufacturing device.

14 Claims, 27 Drawing Sheets

(51) Int. Cl.
    *B33Y 30/00*         (2015.01)
    *B33Y 50/02*         (2015.01)
    *B29C 64/124*       (2017.01)
    *B29C 64/393*       (2017.01)

(56)                 References Cited

U.S. PATENT DOCUMENTS

| | | |
|---|---|---|
| 2009/0190967 A1 | 7/2009 | Mestha et al. |
| 2018/0154441 A1 | 6/2018 | Miller et al. |
| 2019/0351613 A1* | 11/2019 | Frutuoso ............... B29C 64/205 |
| 2021/0197462 A1* | 7/2021 | Brochier ............... B29C 64/232 |

OTHER PUBLICATIONS

Ishi et al, TRANSFORM: Embodiment of "Radical Atoms" at Milano Design Week. In Proceedings of the 33rd Annual ACM Conference Extended Abstracts on Human Factors in Computing Systems (CHI EA '15). ACM, New York, p. 687-694 (Year: 2015).*
International Search Report and Written Opinion of the International Searching Authority (dated Aug. 28, 2018) for Corresponding International PCT Patent Application No. PCT/US18/035673, filed Jun. 1, 2018.
Wang et al. "Research on the fabricating quality optimization of the overhanging surface in SLM process." The International Journal of Advanced Manufacturing Technology (online), Apr. 2013 (Retrieved on Jul. 31, 2018), vol. 65, Issue 9-12, pp. 1471-1484, Abstract only.

* cited by examiner

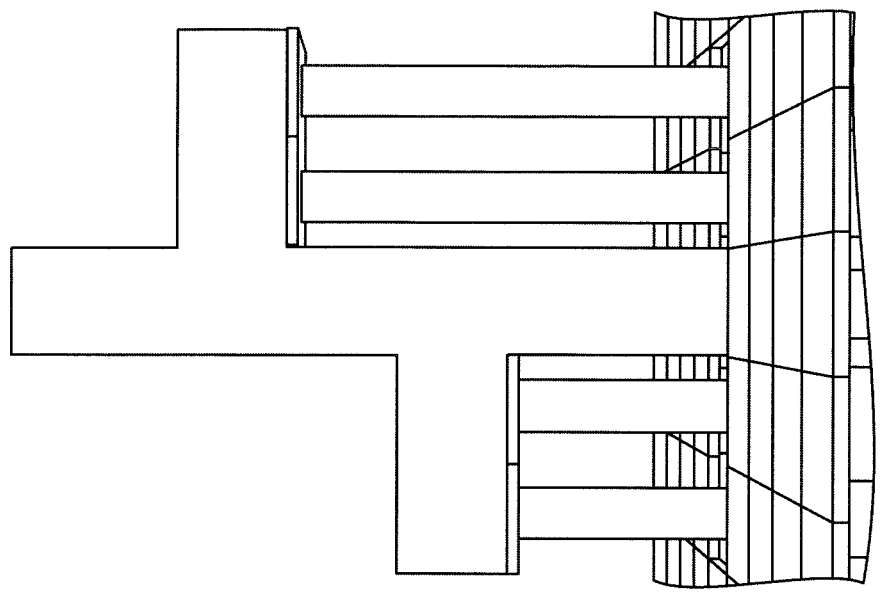
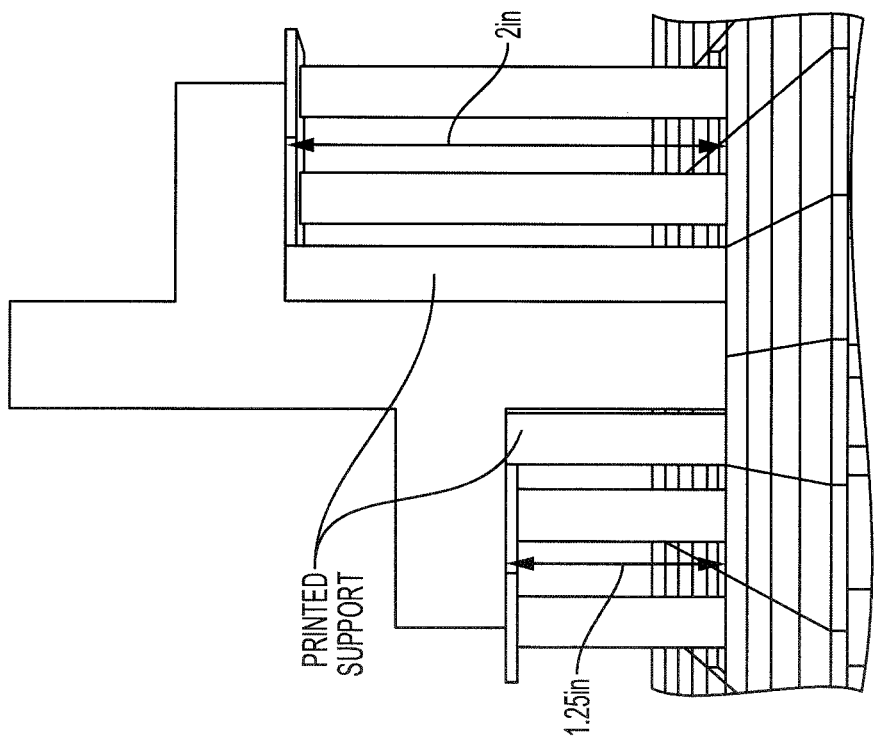
FIG. 9

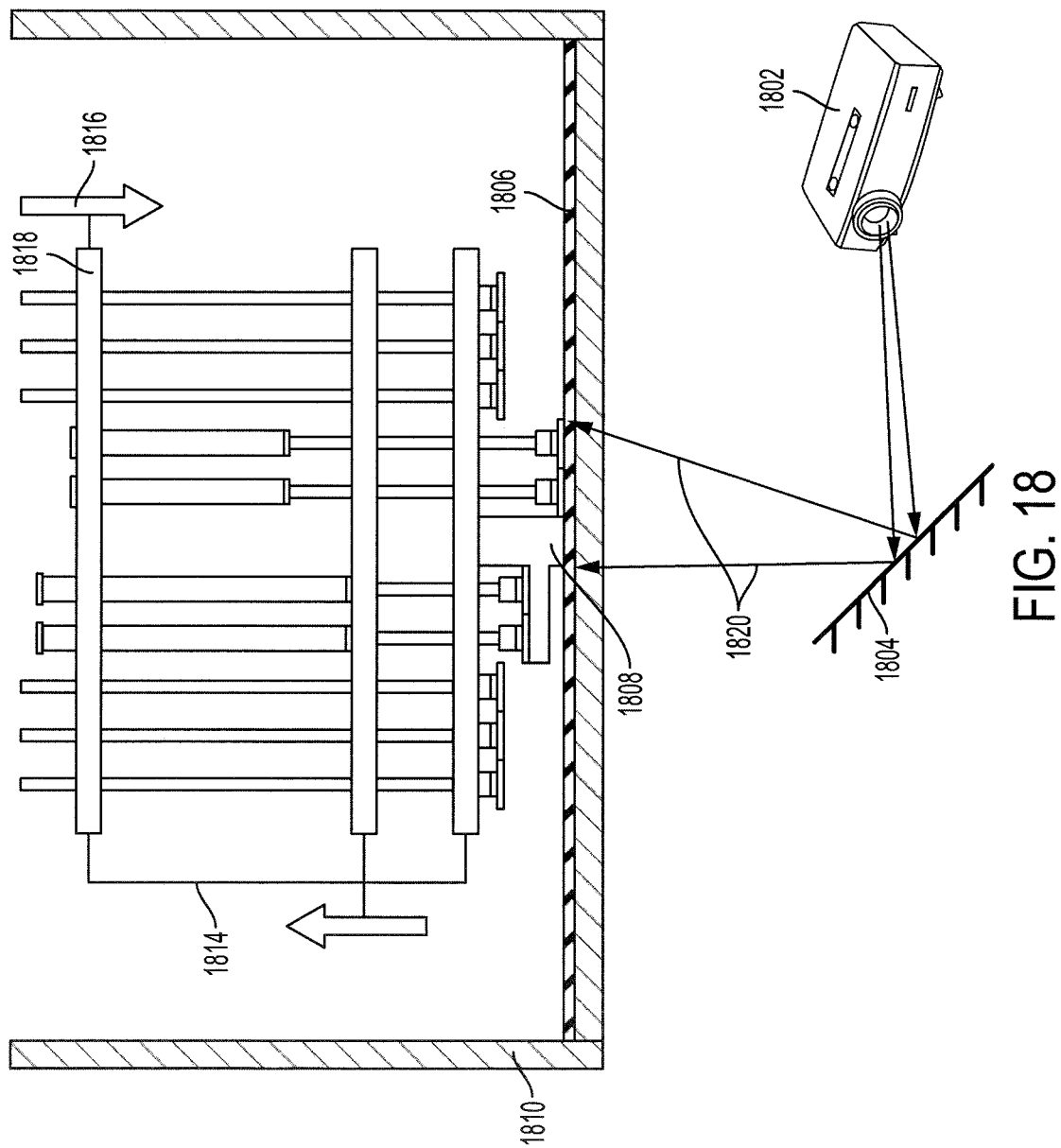

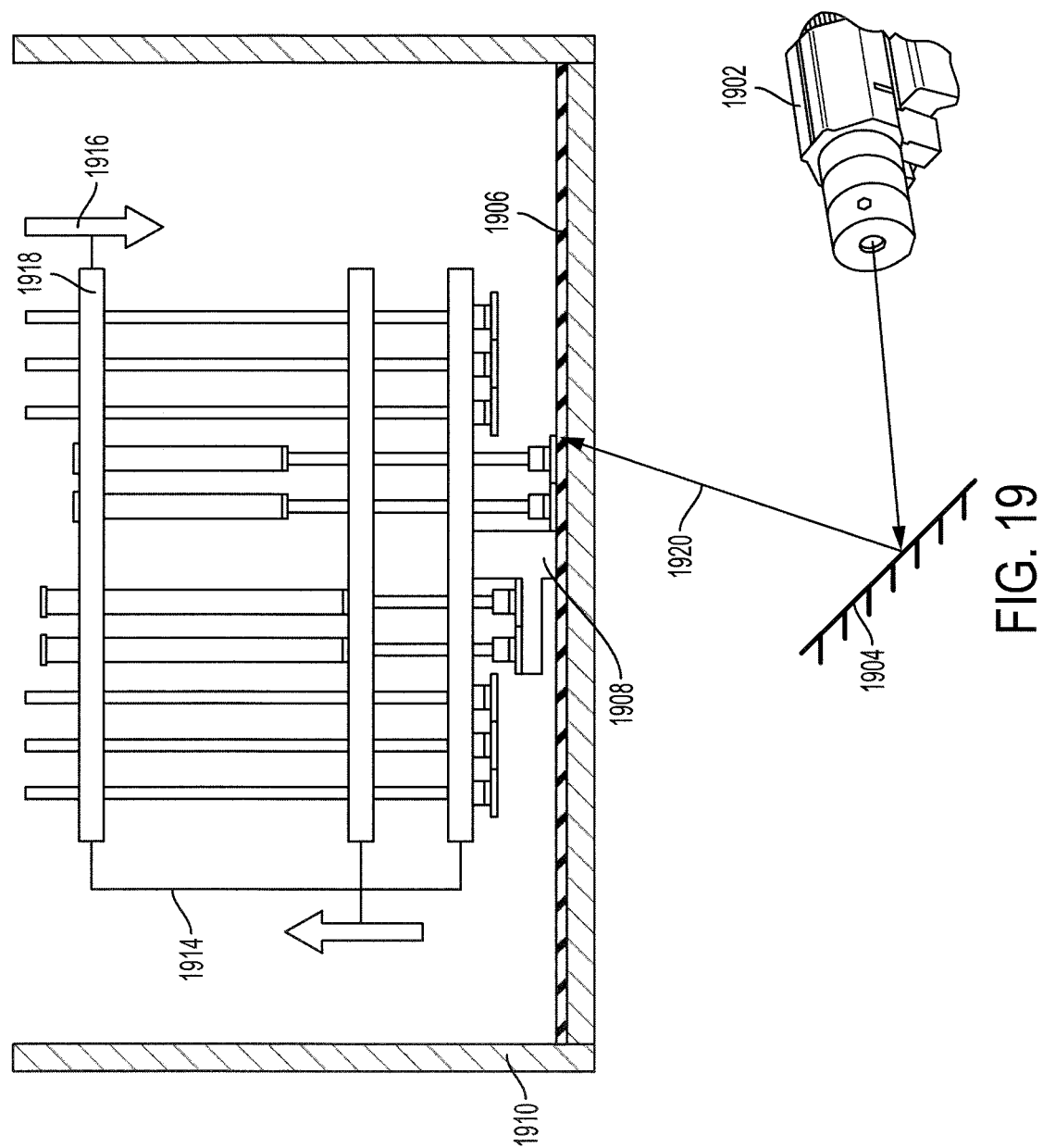

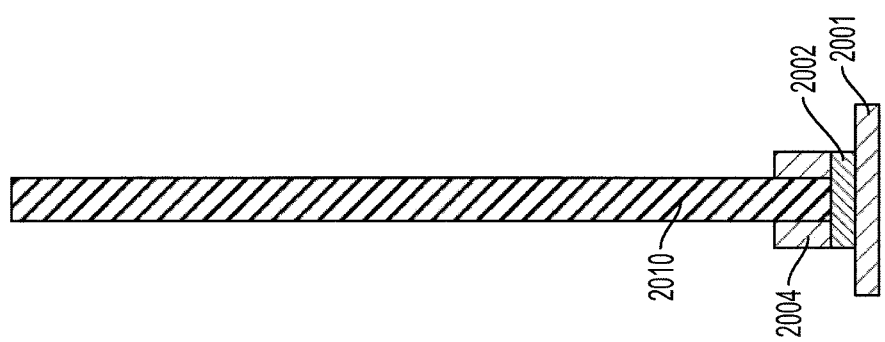

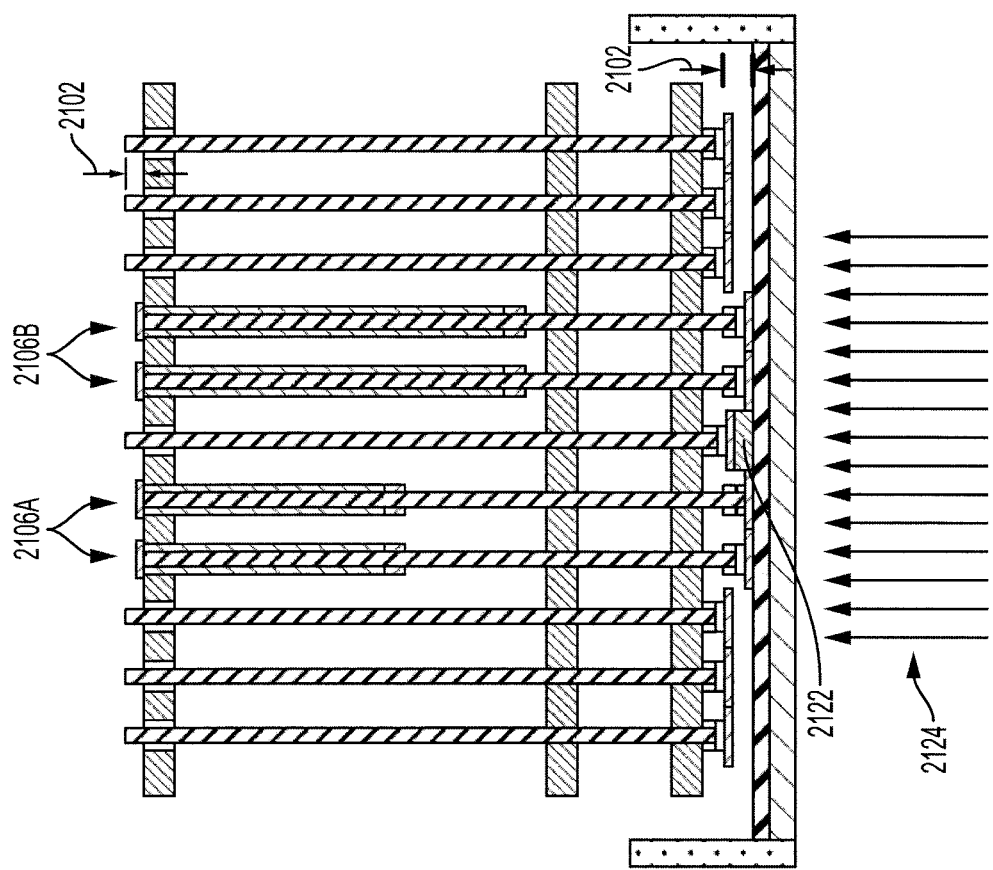
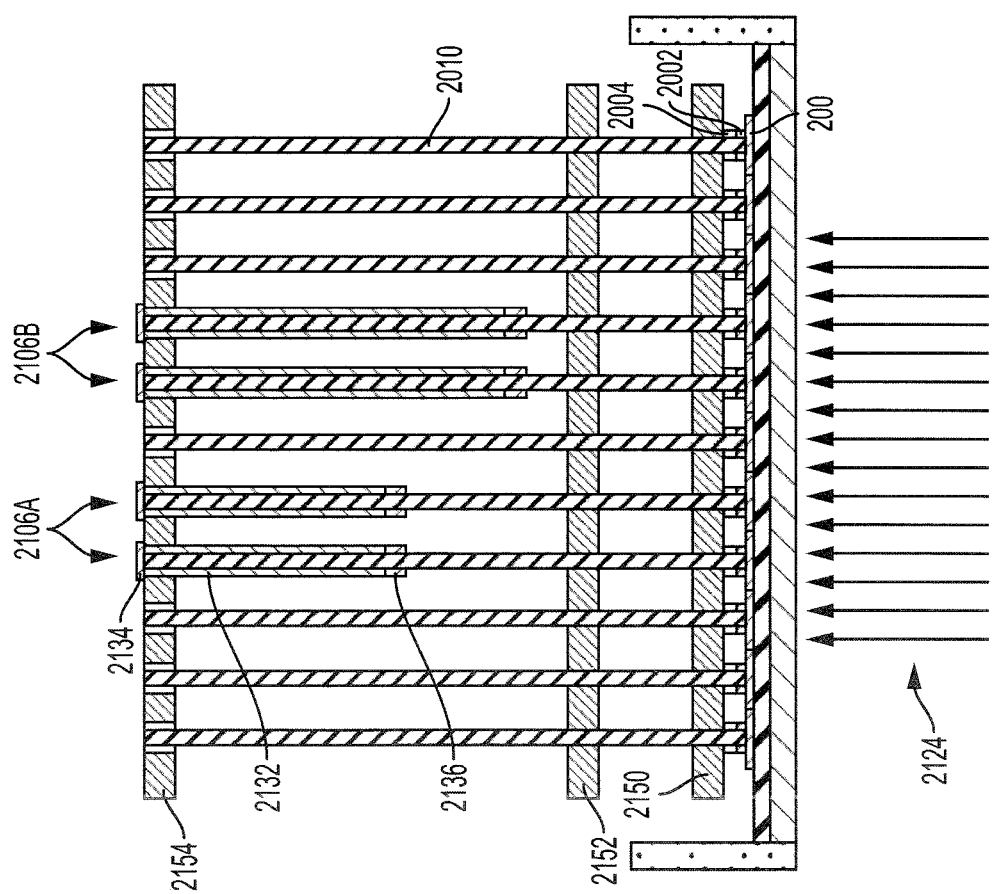

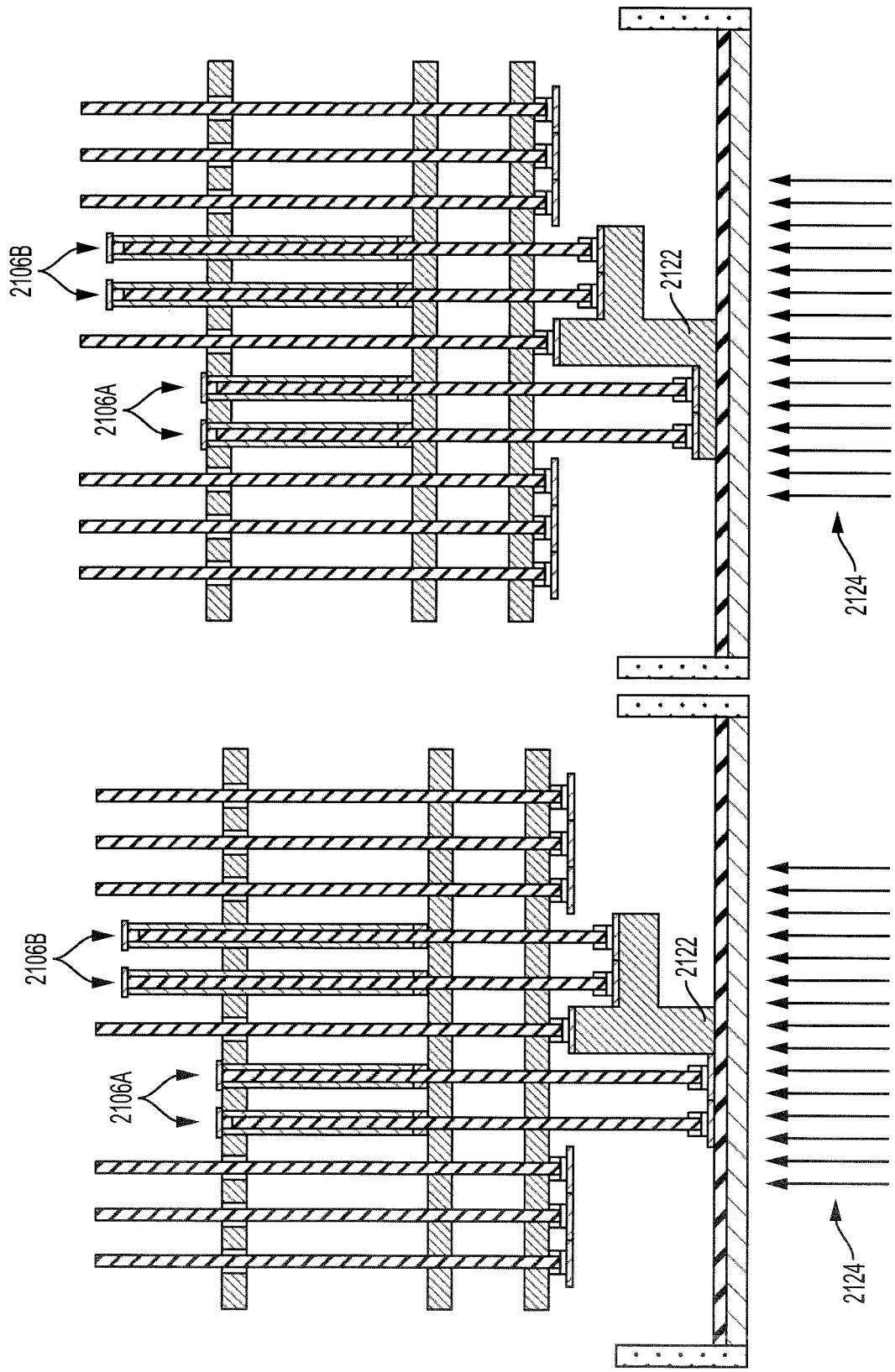

AUTOMATIC REUSABLE SUPPORT FOR 3D PRINTING

CROSS REFERENCE TO RELATED APPLICATIONS

This application claims the benefit and priority of U.S. Provisional Application No. 62/514,698, filed on Jun. 2, 2017, entitled "Automatic Reusable Support for 3D Printing," the contents of which are herein incorporated by reference in its entirety.

BACKGROUND

1. Field of the Invention

The present invention relates to systems and methods for additive manufacturing (commonly referred to as "3D printing"), and more particularly to systems and methods for supporting an article being manufactured by additive manufacturing.

2. Description of the Related Art 3D printing processes fabricate articles in layers. Examples of 3D printing technologies include stereolithography (SLA), Fused Deposition Modeling (FDM), selective laser sintering, selective laser melting, and other technologies. However, in most processes, additive material can only be formed on the top of an existing surface. This causes problems for shapes with overhangs. Such overhang features cannot be printed since there is no supporting layer that is immediately beneath them. The 3D printers based on FDM and SLA technology solve this problem by fabricating additional supporting structures for the overhanging features. The supports are printed using the same or different materials that are discarded after the building process. The additional printed materials as supports contributes to slower printing speed, more material waste, and extra cleaning of the physical model. Therefore, support generation for such technologies is a critical issue. Sometimes, these support structures are difficult to remove. Even worse, the removal of the support structures may cause unexpected damage to the desired parts, resulting in unacceptable surface quality. Support structures use materials that sometimes cannot be recycled cost-effectively. In addition, the printing of the support structures takes time, slowing the printing process.

It would be desirable, therefore, to provide more effective methods and apparatus for supporting components being manufactured using 3D printing processes.

SUMMARY OF THE INVENTION

According to some embodiments, a system for additively manufacturing an object having an overhang feature is described. The system includes a printing platform comprising an array of platform segments forming a deposition surface. The system also includes a plurality of elongated beams each connected to a respective platform segment. The system also includes a moving platform located below the printing platform and configured to attach to a portion of the plurality of elongated beams and elevate the attached elongated beams. The system also includes an additive manufacturing device configured to cause a material to be deposited onto the deposition surface. The system also includes an actuator connected to the moving platform and configured to move the moving platform vertically. The system also includes a controller connected to the additive manufacturing device and the actuator, the controller configured to cause the additive manufacturing device to deposit the material onto the deposition surface and cause the actuator to move the moving platform upward to cause the elongated beams attached to the moving platform and their respective connected platform segments to form a support structure for the overhang when the overhang is fabricated by the additive manufacturing device.

In some embodiments, a method for providing structural support for an overhang feature of an object fabricated using an additive manufacturing process is described. The method includes providing a deposition surface for the object to be fabricated, the deposition surface located on a plurality of platform segments collectively forming a printing platform. The method includes determining, using one or more computing devices, a position and an orientation of a model representing the object to be fabricated. The method includes determining, using the one or more computing devices, a series of vertical movement steps including a position and a degree of vertical movement for one or more elongated beams to be moved during the fabrication of the object, the one or more elongated beams each being connected to a respective platform segment from the plurality of platform segments. The method includes automatically controlling vertical movement of each of the one or more elongated beams during fabrication of the object based on the determined series of fabrication steps, the one or more elongated beams providing the structural support for the overhang.

In some embodiments, a system for additively manufacturing an object having an overhang feature is described. The system includes a printing platform located within a resin tank and comprising an array of platform segments forming a deposition surface. The system includes a plurality of elongated beams located within the resin tank, and each connected to a respective platform segment. The system includes a moving platform and a structural platform located within the resin tank and above the printing platform, the moving platform being moved relative to the structural platform and causing a portion of the plurality of elongated beams to form a support structure for the overhang feature. The system includes an additive manufacturing device configured to fabricate the object within the resin tank and on the deposition surface. The system includes an actuator connected to the moving platform and configured to move the moving platform vertically. The system includes a controller connected to the additive manufacturing device and the actuator, the controller configured to cause the additive manufacturing device to fabricate the object and cause the actuator to move the moving platform upward.

BRIEF DESCRIPTION OF THE DRAWINGS

The features and advantages of the embodiments of the present disclosure will become more apparent from the detailed description set forth below when taken in conjunction with the drawings. Naturally, the drawings and their associated descriptions illustrate example arrangements within the scope of the claims and do not limit the scope of the claims. Reference numbers are reused throughout the drawings to indicate correspondence between referenced elements.

FIG. 9 illustrates layout optimization of the system, according to embodiments of the invention.

FIG. 18 illustrates the system being used with a DLP-based SLA process, according to embodiments of the invention.

FIG. 19 illustrates the system being used with a laser-based SLA process, according to embodiments of the invention.

FIG. 20 illustrates a support structure of the system when used in bottom-up fabrication, according to embodiments of the invention.

FIGS. 21A-21F illustrate a process of fabricating an object in a bottom-up manner using the system, according to embodiments of the invention.

DETAILED DESCRIPTION

In the following detailed description, numerous specific details are set forth to provide an understanding of the present disclosure. It will be apparent, however, to one of ordinarily skilled in the art that elements of the present disclosure may be practiced without some of these specific details. In other instances, well-known structures and techniques have not been shown in detail to avoid unnecessarily obscuring the present disclosure.

Conventional methods of fabricating objects with overhangs result in slower printing speed, more material waste, and extra cleaning of the physical model. The systems and methods described herein use a novel reusable support (or beam) which may be raised to a particular height in synchrony with the additive manufacturing process to provide support for layers which form overhangs. The systems and methods described herein may be used for any given shape and results in a reduced printing and post-processing time, as the printing cost (in time and material) of fabricating the support structures is avoided. In addition, since the support structures described herein may be reused, material costs are saved by avoiding discarding of fabricated support structures.

Figure 1:
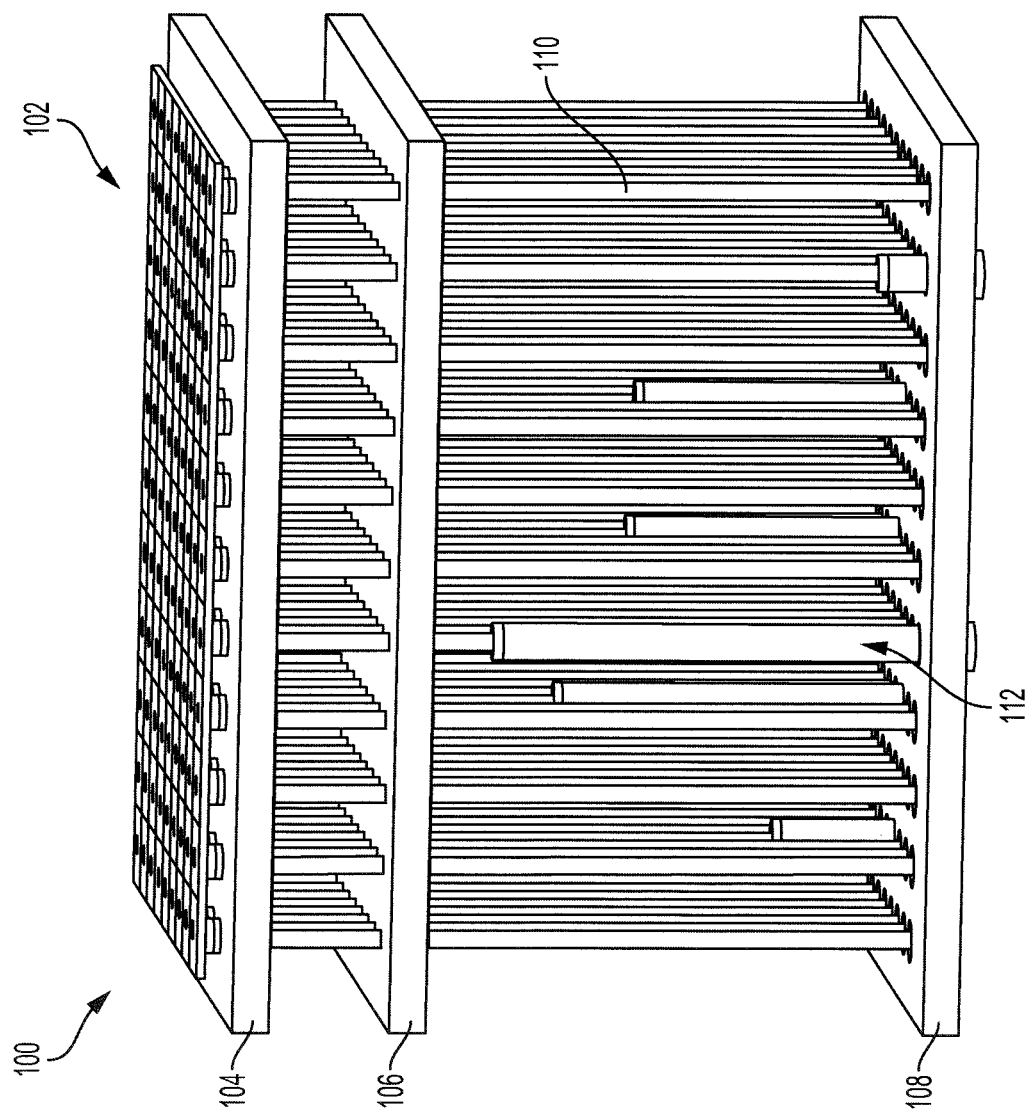
FIG. 1 illustrates an automatic reusable support system for 3D printing, according to embodiments of the invention.

FIG. 1 illustrates a perspective view of an automatic reusable support system 100 for 3D printing. The system includes a deposition surface 102 where the layers of the material is deposited. The material is deposited in layers in three-dimensional space to form a three-dimensional structure or object. The material may be any material capable of being extruded, such as a plastic, a cement, or a metal. The deposition surface 102 is located above a first structural platform (or first-layer sheet) 104, which is located above a second structural platform (or second-layer sheet) 106, which is located above a moving platform (or third-layer sheet) 108. The first structural platform 104, the second structural platform 106, and the moving platform 108 may have a matrix (or array) of openings configured to receive a matrix (or array) of elongated beams (or supports) 110. The elongated beams 110 may be made of any rigid material, such as metal or plastic.

The deposition surface 102 is made of a matrix of squares, with each square supported by the elongated beam 110. As the material is deposited onto the deposition surface 102, the height of various squares may be adjusted in order to form the support structures required to fabricate objects having overhangs. Some of the elongated beams 110 are surrounded by a limiting structure 112 configured to limit the height the elongated beams 110 may be raised.

Figure 2:
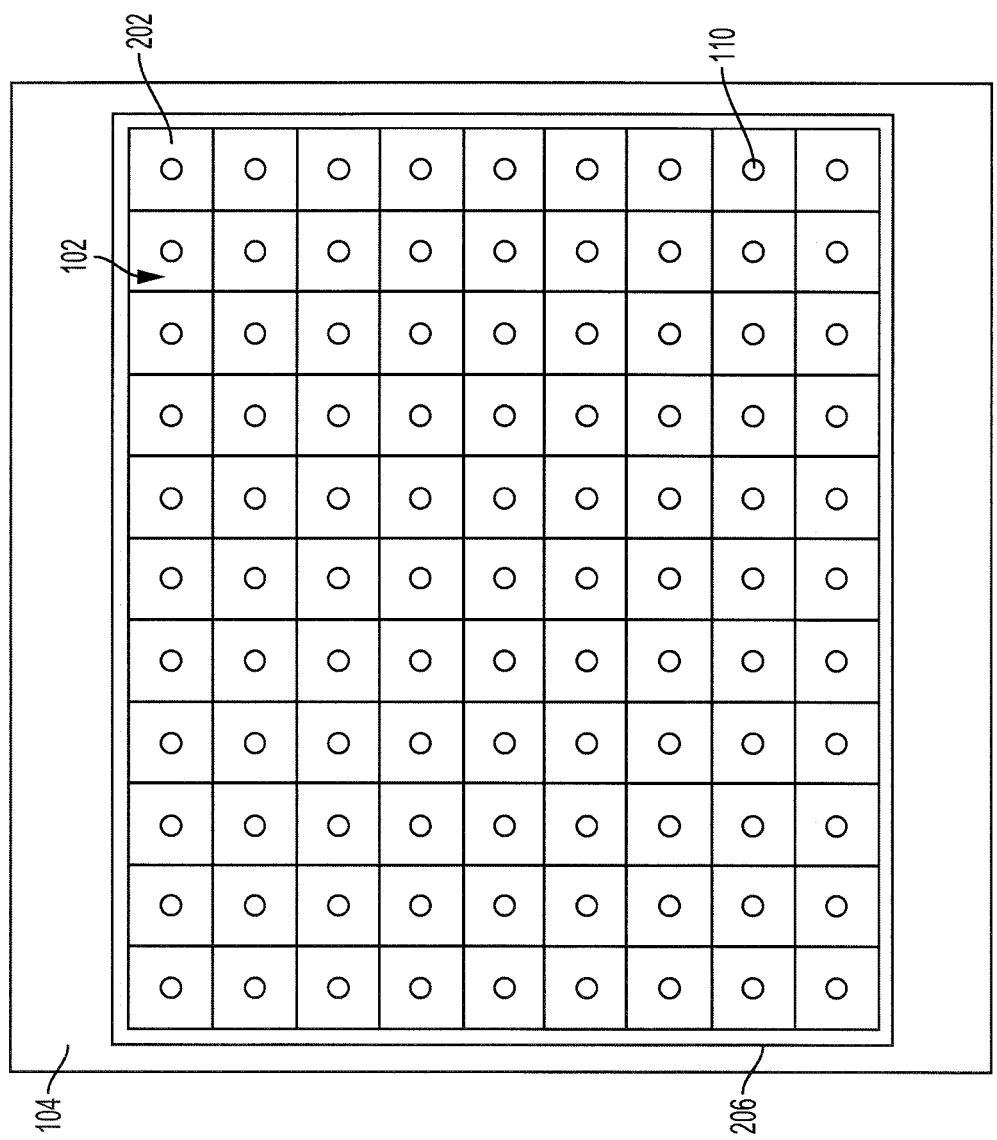
FIG. 2 illustrates a top view of the system illustrated in FIG. 1, according to embodiments of the invention.

FIG. 2 illustrates a top view of the system 100 of FIG. 1. The deposition surface 102 is made of a matrix of platform segments (or washers) 202. The platform segments may be made of any non-porous material, such as metal. While illustrated as being square in shape, the platform segments 202 may be any shape. The platform segments 202 are each supported by an elongated beam 110. The matrix of platform segments 202 may collectively form a printing platform 206. The printing platform 206 may be located above the first structural platform 104. While also illustrated as having a hole in the center of the platform segment 202, in some embodiments, each platform segment 202 may be solid (i.e., not having a hole).

Figure 3:
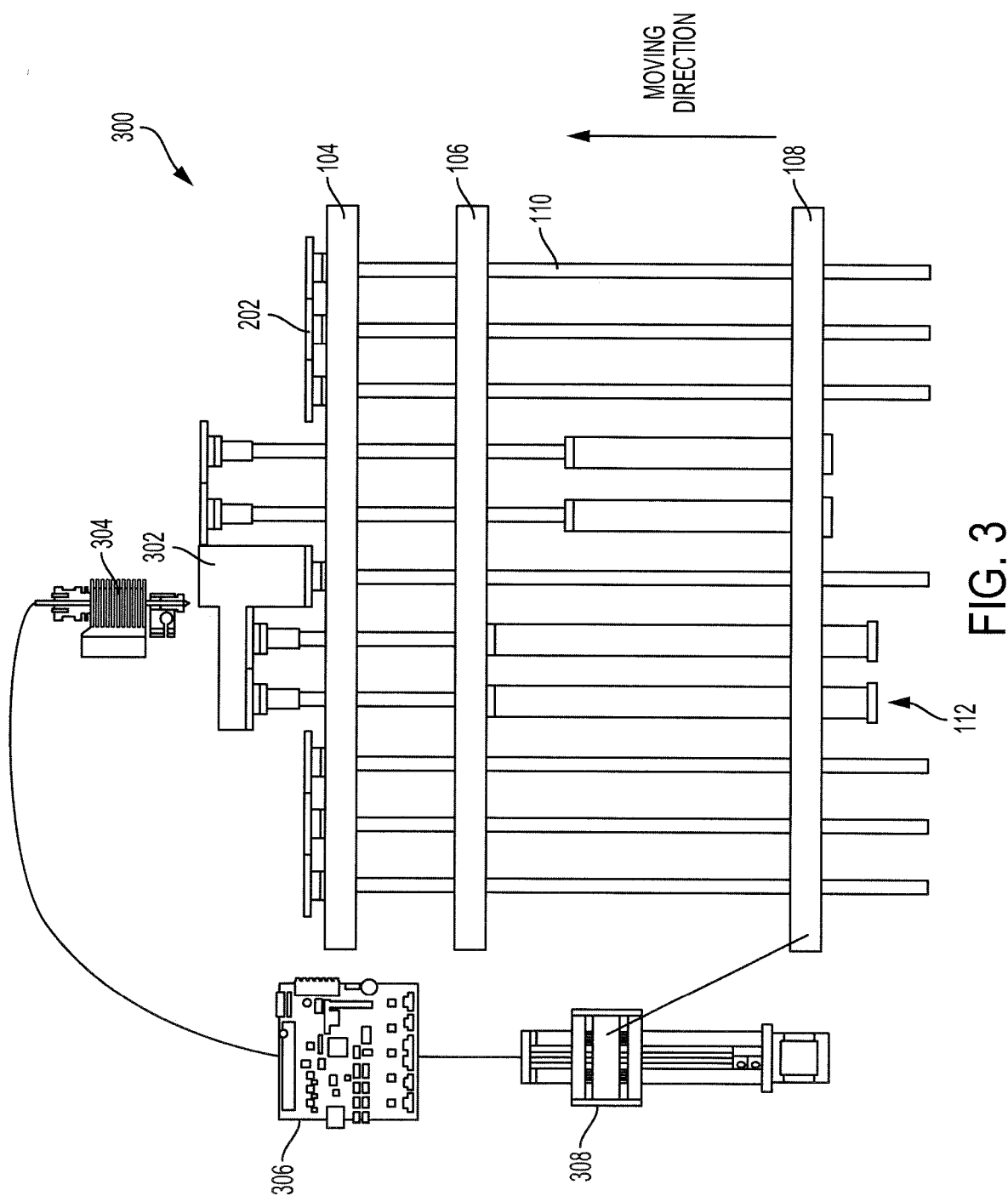
FIG. 3 illustrates an exemplary automatic reusable support system for 3D printing, according to embodiments of the invention.

FIG. 3 illustrates a side cross-sectional view of an automatic reusable support system 300 for 3D printing. The system 300 includes the components of FIGS. 1 and 2, including a plurality of platform segments 202 supported by elongated beams 110.

The system 300 also includes a printer head 304 configured to deposit material onto the plurality of platform segments 202. The deposited material forms the object 302 being fabricated. The printer head 304 may move anywhere in a plane parallel with the surfaces of the platform segments 202. The movement of the printer head 304 may be controlled by a controller 306. The controller 306 may comprise a processor and a non-transitory memory configured to store instructions to be executed by the processor. The controller 306 may instruct the printer head 304 to move laterally, and may also instruct the printer head 304 to extrude or deposit material onto the platform segments 202. The controller 306 may also instruct an actuator 308 to move the moving platform 108 vertically.

The controller 306 is connected to an actuator 308 configured to move the moving platform 108. The first structural platform 104 and the second structural platform 106 may remain stationary relative to the moving platform 108. As the moving platform 108 is moved upward, a portion of the elongated beams 110 are also moved upward, and correspondingly, a portion of the platform segments 202 are also moved upward. The first structural platform 104 may be configured to maintain the relative spacing of the elongated beams 110.

As shown in FIG. 3, by selectively moving some of the platform segments 202 upward and selectively leaving some of the platform segments 202 stationary, an object 302 having overhangs may be fabricated. The length and location of the limiting structures 112 may be configured prior to beginning the 3D printing process. The lateral movement of the printer head 304 and the vertical movement of the moving platform 108 may be coordinated by the controller 306.

Figure 4:
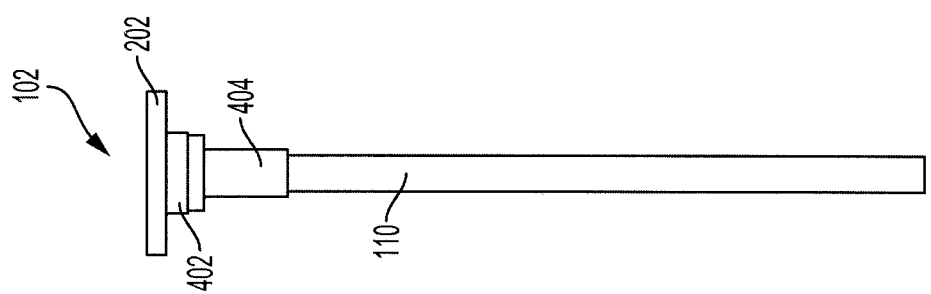
FIG. 4 illustrates a support structure of the system, according to embodiments of the invention.

FIG. 4 illustrates elements of the automatic reusable support system for 3D printing described herein. The elongated beam 110 is connected at one end to a connector 404. The connector 404 may be made of plastic and configured to surround and house one end of the elongated beam 110. The connector 404 may have only one opening on a first end to receive the elongated beam 110, and may connect to a magnetic ring 402 on the second end. The magnetic ring 402 may be removably coupled to the platform segment 202. In some situations, the platform segment 202 may be removed from the magnetic ring 402 when fabrication of the object is completed and the object may be stuck to the platform segment 202.

In some embodiments, instead of using a connector 404, the elongated beam 110 may be directly connected to the magnetic ring 402. The elongated beam 110 may be connected to the magnetic ring 402 via welding, brazing, an adhesive, interference fit, or any other process.

Figure 5:
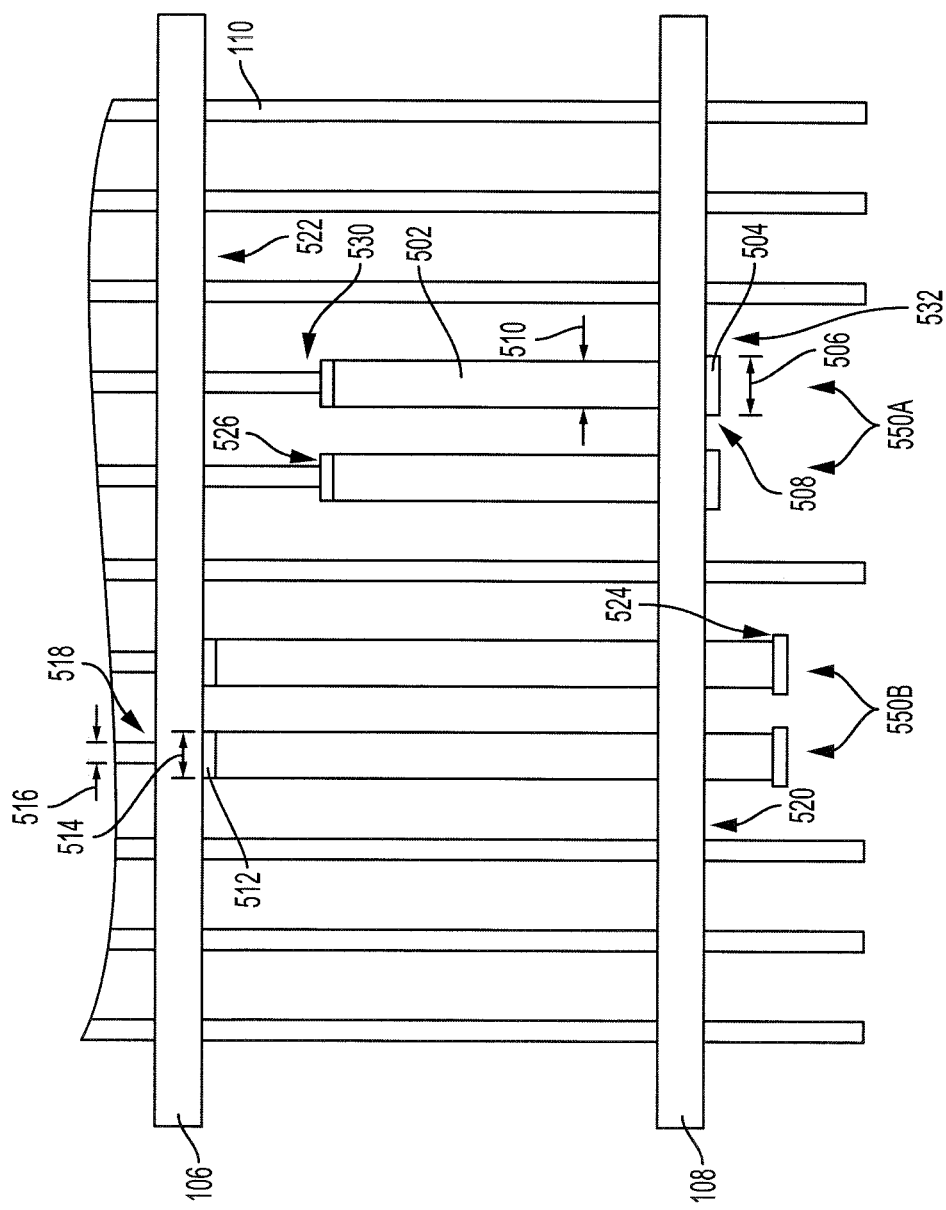
FIG. 5 illustrates the variable height components of the system, according to embodiments of the invention.

FIG. 5 illustrates elements of the automatic reusable support system for 3D printing that are movable. As described herein, the moving platform 108 moves upward and the second structural platform 106 remains stationary. Thus, the distance between the moving platform 108 and the second structural platform 106 decreases over time, as the object is fabricated.

The elongated beam 110 is received by a beam sleeve (or tube) 502. The beam sleeve 502 may be made of any rigid material, such as metal or plastic. The beam sleeve 502 has a top end 530 and a bottom end 532. The beam sleeve 502 has a circular side wall defining a cavity for receiving the elongated beam 110. The top end 530 of the beam sleeve 502 is connected to a magnetic ring 512. The magnetic ring 512 has an opening configured to allow the elongated beam 110 to pass through the magnetic ring 512 and into the cavity of the beam sleeve 502. The bottom end 532 of the beam sleeve 502 has a magnetic disc 504. The magnetic disc 504 may be a solid disc having no opening or may be ring-shaped and having an opening.

The moving platform 108 has a matrix of openings 508, which are configured to allow the beam sleeve 502 or an elongated beam 110 to pass through the moving platform 108 from the bottom end of the moving platform 108. Accordingly, the diameter of the openings 508 are equal to or greater than the diameter 510 of the beam sleeve 502 and the diameter 516 of the elongated beam 110. The magnetic disc 504 has a disc diameter 506 which is wider than the diameter of the openings 508.

The magnetic disc 504 has a top surface 524, which is configured to contact the bottom surface 520 of the moving platform 108. The moving platform 108 may be made of a metal material that the magnetic disc 504 is attracted to. Therefore, the beam sleeve 502 may move along with the moving platform 108 as the moving platform 108 moves upward, as shown by the columns 550A. In other words, the beam sleeve 502, the elongated beam 110, and the platform segment connected to the elongated beam 110 are removably connected to the moving platform 108 by the magnetic disc 504.

The second structural platform 106 has a matrix of openings 518, which are configured to allow the elongated beam 110 to pass through the second structural platform 106. However, the beam sleeve 502 and the magnetic ring 512 located on the top end 530 of the beam sleeve 502 are not allowed to pass through the second structural platform 106. Accordingly, the diameter of the openings 518 are equal to or greater than the diameter 516 of the elongated beam, but less than the diameter 514 of the magnetic rings 512.

The magnetic ring 512 has a top surface 526, which is configured to contact the bottom surface 522 of the second structural platform 106. The second structural platform 106 may be made of a metal material that the magnetic ring 512 is attracted to. When the top surface 526 of the magnetic ring 512 contacts the bottom surface 522 of the second structural platform 106, the beam sleeve 502 is not capable of being elevated any further, as the diameter of the openings 518 are not wide enough to allow the magnetic ring 512 to pass through. The moving platform 108 will persist in moving upward. In doing so, the magnetic disc 504 attached to the bottom end 532 of the beam sleeve 502 will release from the bottom surface 520 of the moving platform 108 when the force of the moving platform 108 moving upward overcomes the magnetic force between the magnetic disc 504 and the bottom surface 520 of the moving platform 108. Once the magnetic disc 504 releases from the bottom surface 520 of the moving platform 108, the beam sleeve 502 is prevented from sliding down to the bottom by the magnetic force between the magnetic ring 512 and the bottom surface 522 of the second structural platform 106. This is shown by columns 550B.

FIGS. 6A-6F illustrate a process of fabricating an object using the automatic reusable support system for 3D printing.

As described herein, the system includes a deposition surface 102 made of a matrix of platform segments 202. The platform segments 202 are connected to elongated beams 110 via a magnetic ring 402. The magnetic ring 402 may be connected to the elongated beam 110 via a connector 404. The elongated beam 110 runs through the first structural platform 104, the second structural platform 106, and the moving platform 108. Some of the elongated beams 110 are surrounded by a beam sleeve 502 having a magnetic ring 512 connected to the top side and a magnetic disc 504 connected to the bottom side.

Figure 6B:
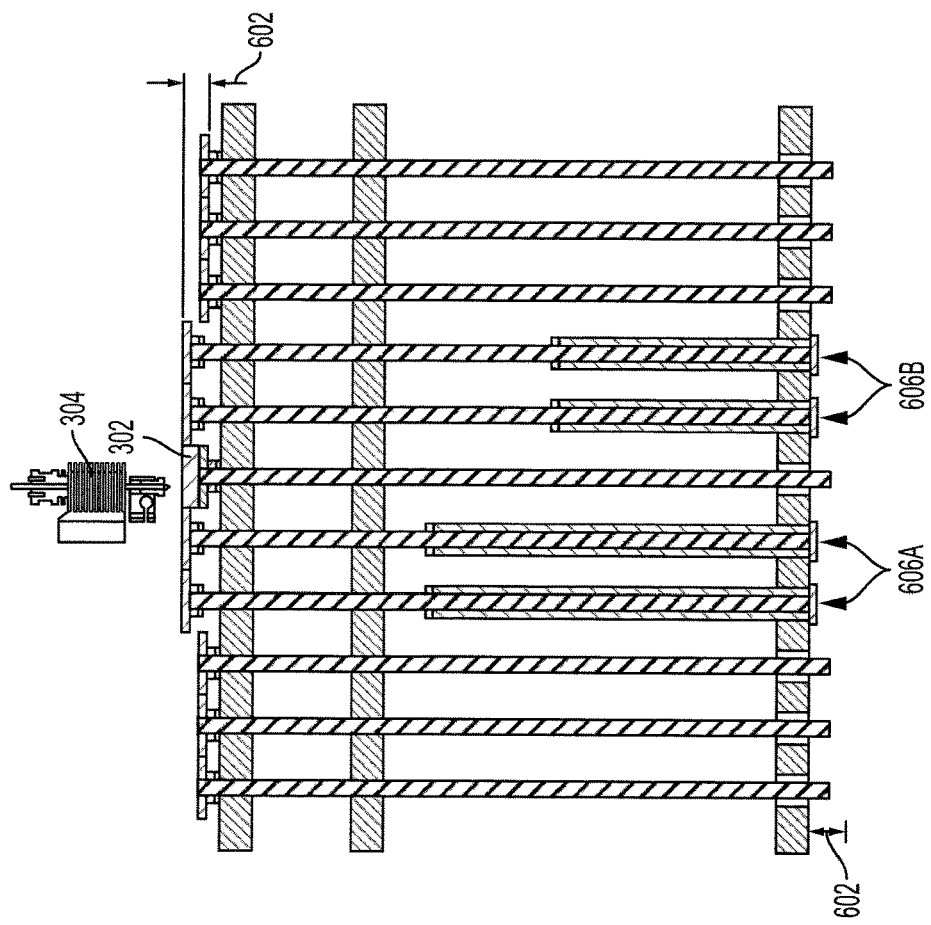
FIGS. 6A-6F illustrate a process of fabricating an object using the system, according to embodiments of the invention.
Figure 6A:
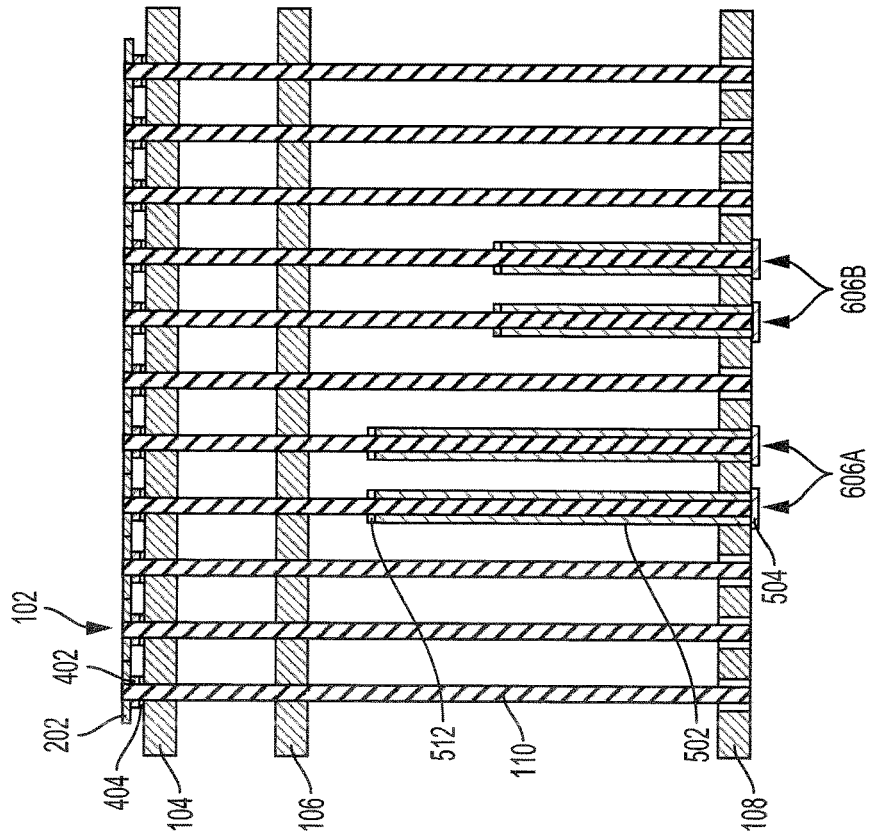

FIGS. 6A-6F illustrate the movements of two pairs of movable support columns 606A and 606B. In FIG. 6A, both the first pair of movable support columns 606A and the second pair of movable support columns 606B begin in an unextended state, with the moving platform 108 near the bottoms of the elongated beams 110 and the deposition surface 102 being substantially flat and even.

In FIG. 6B, the moving platform 108 moves upward by a first distance 602. Before, during, or after this movement, the printer head 304 has deposited material onto the deposition surface 102 to form part of the object 302. The first distance 602 may correspond to a height of each layer deposited onto the object 302. When the moving platform 108 moves upward, the first pair of movable support columns 606A and the second pair of movable support columns 606B also move upward because of the connections between the magnetic discs 504 of the first pair of movable support columns 606A and the second pair of movable support columns 606B and the bottom surface of the moving platform 108, as described herein. As a result, when the moving platform 108 moves upward by the first distance 602, the platform segments corresponding to the first pair of movable support columns 606A and the second pair of movable support columns 606B also move upward by the first distance 602.

Figure 6D:
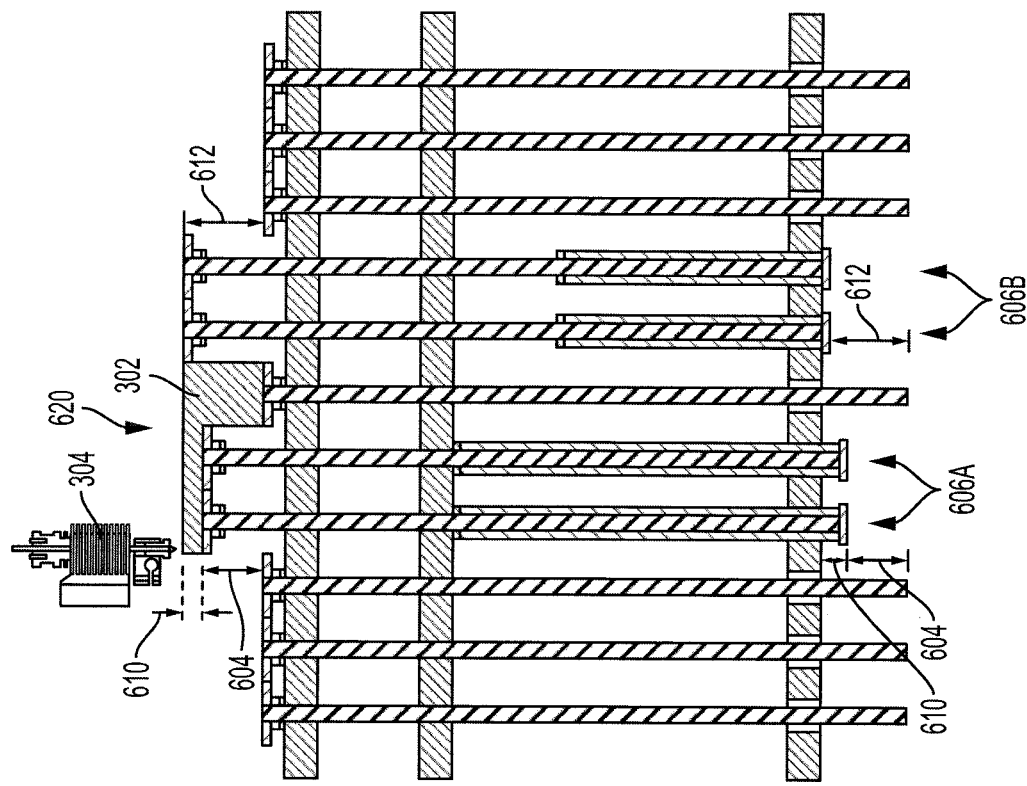
Figure 6C:
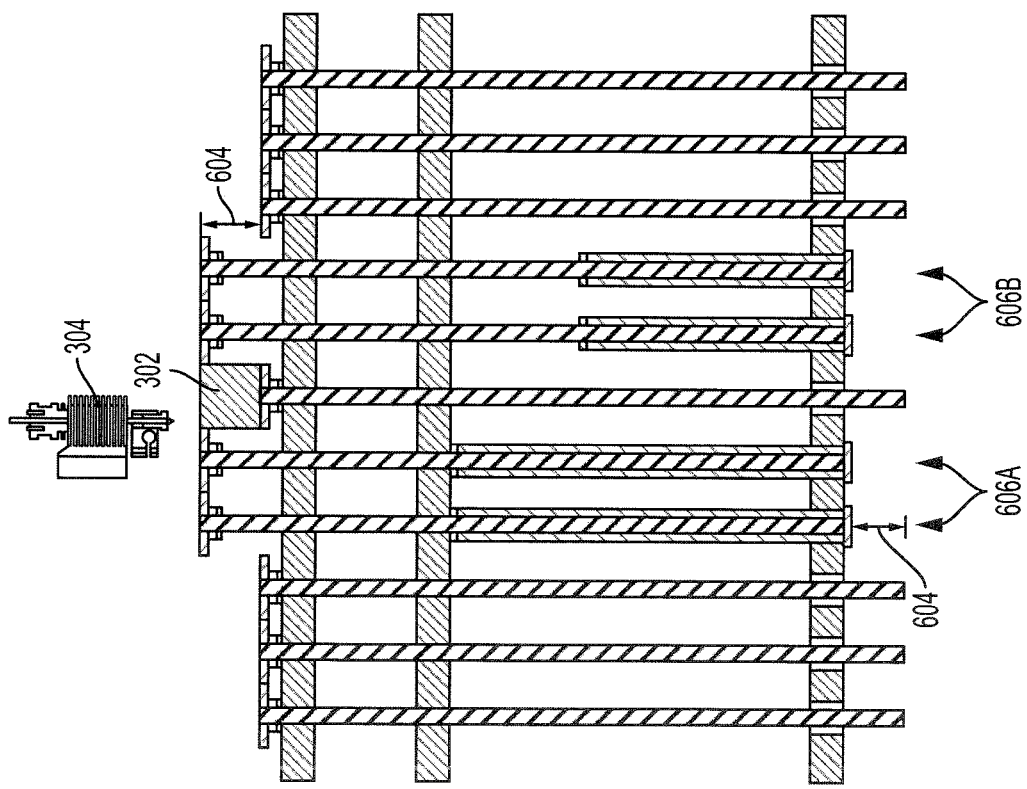

In FIG. 6C, the moving platform 108 proceeds with moving upward. At this point, the moving platform 108 has moved upward by a second distance 604. Before, during, or after this movement, the printer head 304 has deposited additional material onto the object 302 to further fabricate the object 302. The difference between the second distance 604 and the first distance 602 may correspond to a height of each layer deposited onto the object 302. The platform segments corresponding to the first pair of movable support columns 606A and the second pair of movable support columns 606B have also moved upward by a second distance 604. The first pair of movable support columns 606A has moved upward to the point where the magnetic ring 512 on the top end of the beam sleeve 502 is contacting the bottom surface of the second structural platform 106.

In FIG. 6D, the moving platform 108 further proceeds with moving upward. At this point, the moving platform 108 has moved upward by a third distance 612. Before, during, or after this movement, the printer head 304 has deposited additional material onto the deposition surface 102 and the object 302 to further fabricate the object 302. The difference between the third distance 612 and the second distance 604 may correspond to a height of each layer deposited onto the object 302. As described herein, the opening of the second structural platform 106 does not allow the beam sleeve 502 to pass through. As a result, the magnetic discs 504 of the first pair of movable support columns 606A are released from the bottom surface of the moving platform 108, but remain attached to the stationary second structural platform 106 via the magnetic rings 512. Accordingly, the first pair of movable support columns 606A do not move upward as the moving platform 108 is moved upward, and the platform segments of the first pair of movable support columns 606A remain moved by only the second distance 604. By contrast, the second pair of movable support columns 606B remain moving upward and are moved by the third distance 612. The difference between the third distance 612 and the second distance 604 is a difference 610.

As a result of the first pair of movable support columns 606A being able to move upward, an overhang 620 of the object 302 is capable of being fabricated without fabricating a support structure.

Figure 6E:
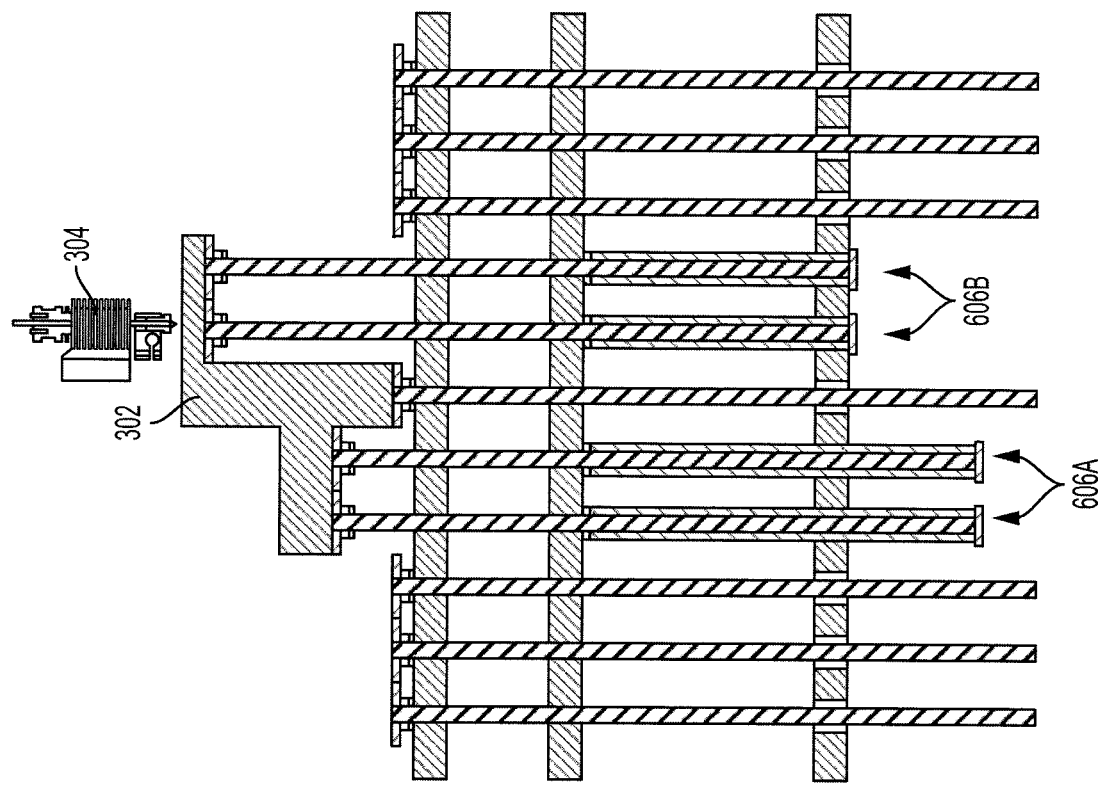
Figure 6F:
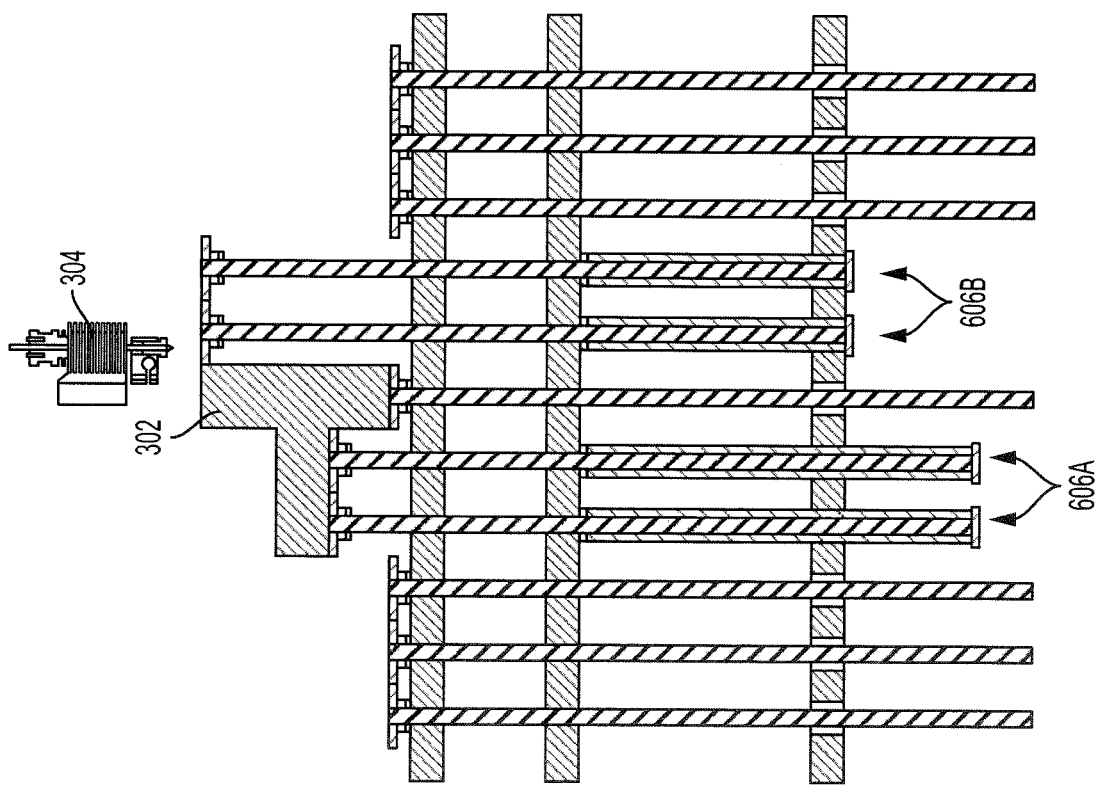

FIGS. 6E and 6F show the further steps of the process of fabricating the object 302 without use of fabricated support structures. As can be seen from the resulting object 302 shown in FIG. 6F, an object having multiple overhangs can be fabricated without using one-time fabricated support structures.

The beam sleeves 502 have a predefined length, and the beam sleeves used in the system when an object is fabricated may be changed based on the geometry of the object to be fabricated. The beam sleeves may receive any of the elongated beams 110, and may be removably coupled to the elongated beams 110 using magnets, adhesive, or an interference fit, for example.

Upon completion of the fabrication of the object 302, the moving platform 108 is moved downward to its original position. The moving of the moving platform 108 downward will cause the magnetic disc 504 to contact the bottom surface of the moving platform 108, thereby causing the pulling down of the beam sleeves 502 from the second structural platform 106. Accordingly, the magnetic ring 512 will detach from the bottom surface of the second structural platform 106. The elongated beams 110 may be removed from the object 302 and may be reused, along with the beam sleeves 302 and every other element of the system.

Figure 7:
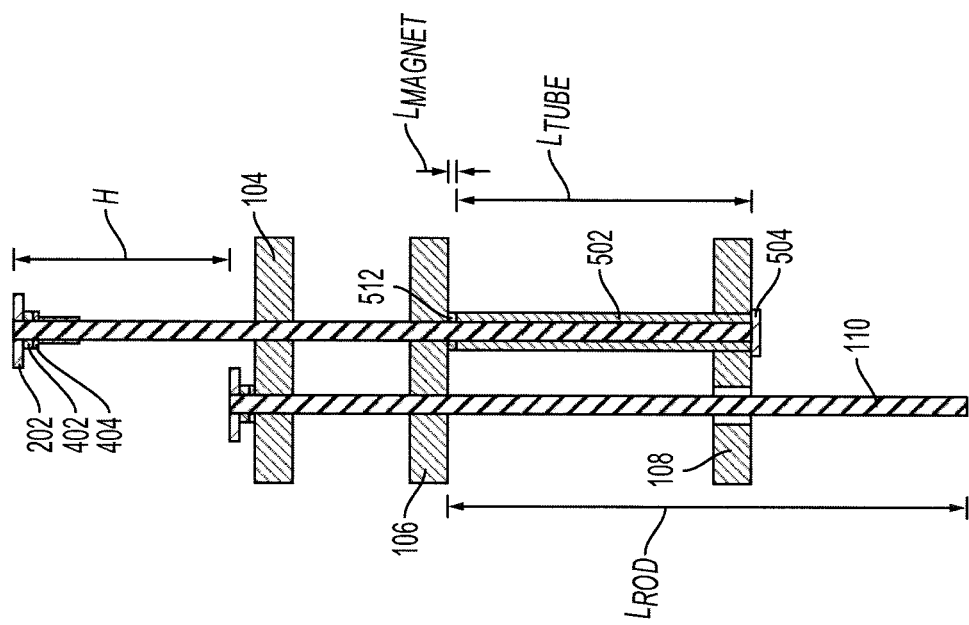
FIG. 7 illustrates various dimensions of the variable height components of the system, according to embodiments of the invention.

FIG. 7 illustrates the relationship between the dimensions of the elongated beams and the beam sleeves and the height of the overhang (or bottom of the printed support). The height of the elongated beam 110 may be defined by the length of the elongated beam 110 between the second structural platform 106 and the moving platform 108, as well as the beam sleeve 502 and the magnetic ring 512. Their relationship, as shown in FIG. 7, can be calculated as: $H = L_{Rod} - L_{Tube} - L_{Magnet}$.

Figure 8:
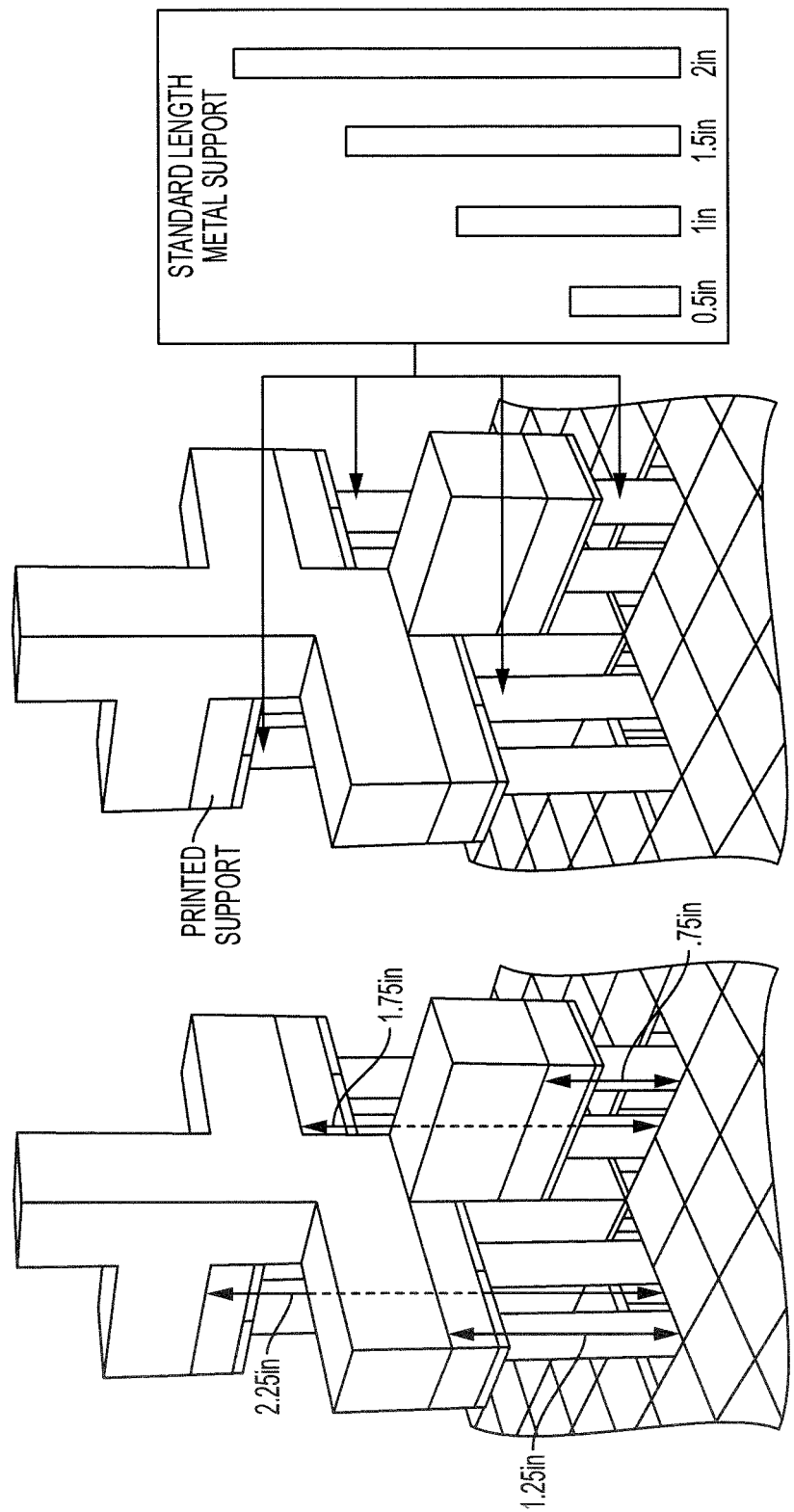
FIG. 8 illustrates an example object fabricated using the system, according to embodiments of the invention.
Figure 10:
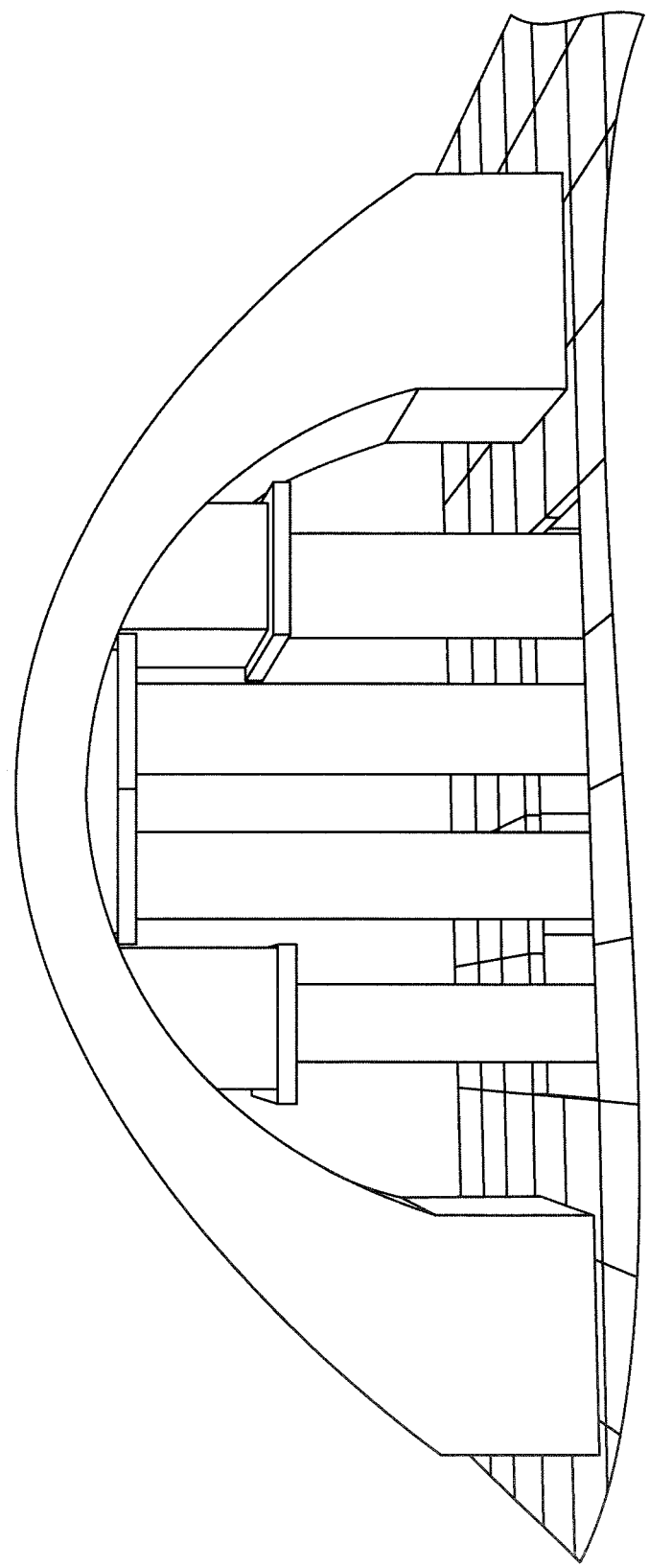
FIG. 10 illustrates a simulated object to be fabricated using the system, according to embodiments of the invention.
Figure 11:
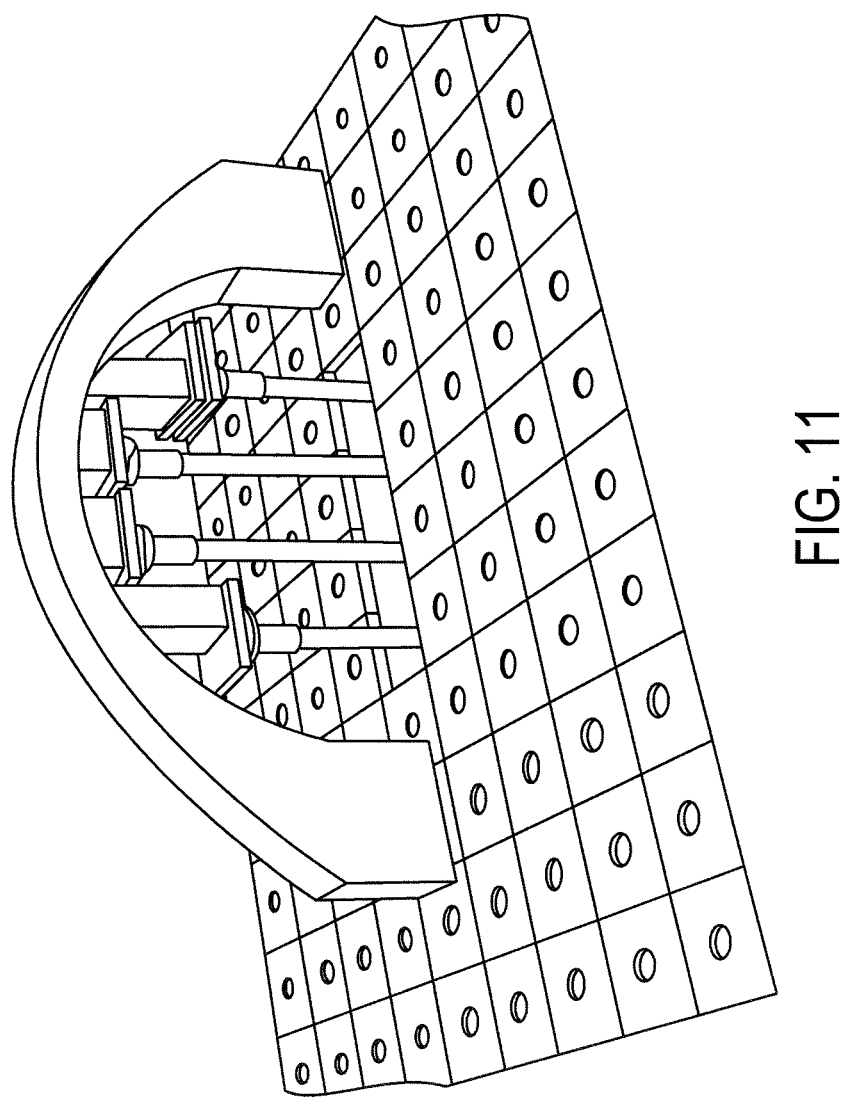
FIG. 11 illustrates a fabricated object based on the simulated object shown in FIG. 10, according to embodiments of the invention.

In some embodiments, the beam sleeve 502 lengths may be dynamically adjustable. In other embodiments, the beam sleeves 502 may have predetermined, static lengths (e.g., 0.5 inch, 1 inch, 1.5 inches). For any given model, the users can use a support generation software to calculate the position of the metal elongated beams and the related beam sleeve lengths that are required for desired heights. In some situations, the computer aided drafting (CAD) model may require elongated beams at a different height from the provided beam sleeves with the predetermined, static lengths. In these situations, the nearest height to the standard length that is shorter will be selected, and the elongated beam will rise to the selected standard length. The remaining portion of the support structure will be 3D-printed on the top of the metal support. An example is shown in FIG. 8, in which the heights of the four arms of the object are 0.75 inch, 1.25 inches, 1.75 inches, and 2.25 inches, respectively. The nearest standard lengths of elongated beams may be 0.5 inch, 1 inch, 1.5 inches, and 2 inches, respectively. Therefore, an additional 0.25 inch of support will be 3D-printed on each metal pin support. A more complex example is shown in FIGS. 10 and 11. FIG. 10 illustrates the computer generated model of the object and FIG. 11 shows the fabricated object using a combination of the reusable supports described herein and fabricated supports.

The placement of a CAD model to be printed on the platform can be optimized by defining its X, Y positions and the rotation angle θ. A support planning software is configured to reduce the amount of 3D-printed supports and the required number of elongated beams 110. FIG. 9 illustrates an example of the support comparison before and after the optimization. Through the part layout optimization, the effectiveness and efficiency of the automatic and reusable support can be improved.

The location of each beam sleeve, the lengths of the beam sleeves, where on the deposition surface to deposit the material, where to deposit any potential support structures, and the optimization thereof for purposes of minimizing materials used may all be determined by a computer having a processor and a non-transitory memory. The computer may be specially configured for this purpose. The determinations described herein may be performed more accurately by a computer than by a human being. Further, the optimization steps performed by the computer improves the existing technology of additive manufacturing, which is an existing computer technology. In some embodiments, the controller 306 is configured to make the determinations of the location of each beam sleeve, the lengths of the beam sleeves, where on the deposition surface to deposit the material, where to deposit any potential support structures, and the optimization thereof. In some embodiments, the location of each beam sleeve and the lengths of the beam sleeves are displayed on a display screen such that a human being may read the display and manually configured the locations of the corresponding beam sleeves. In other embodiments, an articulating arm automatically grasps and places the corresponding beam sleeves before beginning the fabrication process such that no human involvement is required in the fabrication process These determinations may be made by specially developed software executed on a computing device before the manufacturing process. This software determines the location of each beam sleeve and the lengths of the beam sleeves. It may also optimize the position and orientation of the model representing the part to be printed. Based on these determinations, the software will generate a instructions to the controller 306 (e.g., a G-Code file). The G-Code file can tell the controller 306 how to run the motors so that the material can be deposited to the right place to fabricate the part or residual support and move the beams. The generated G-Code file can be sent to the controller 306 in real-time from a computing device or stored in a non-transitory memory card and inserted into the controller 306. The controller 306 may read the G-Code file and run the motors accordingly. While conventional FDM 3D printing processes generate G-Code files, the systems and methods described herein take more problems into consideration, such as the position and the length of the beam, the best position, and orientation of the part, for example. When the controller 306 is configured to perform the duties of the computing device described herein, the controller 306 may be specially configured to perform these determinations, rendering it a special-purpose machine.

Figure 12A:
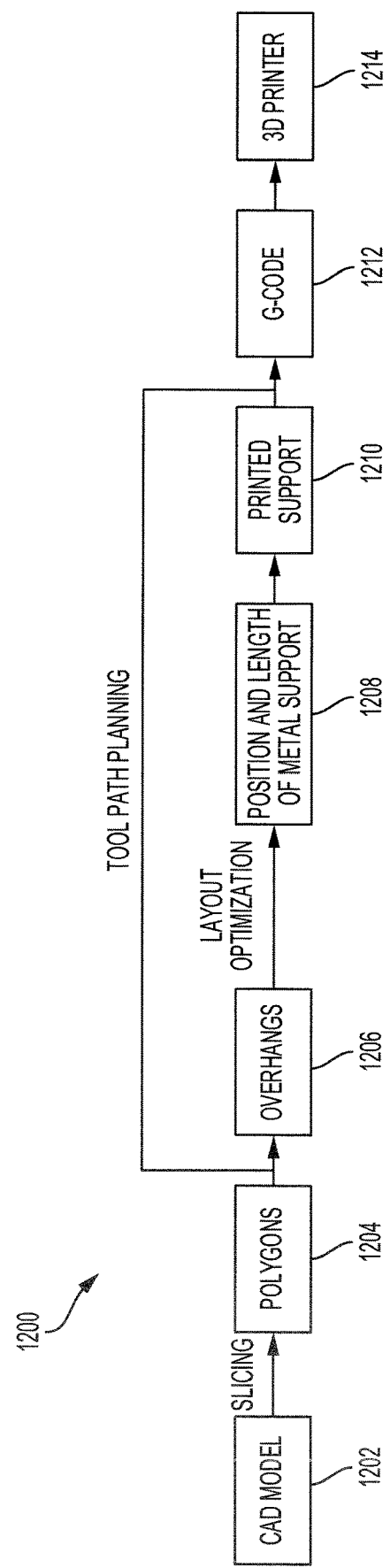
FIG. 12A illustrates an example flowchart of 3D printing software, according to embodiments of the invention.

FIG. 12A illustrates a flowchart of the 3D printing software used to fabricate an object using the systems and methods described herein. Compared to a conventional 3D printing process, the reusable support is incorporated in the fabrication of each layer. Given an input 3D model, software executed by the computer follows the process 1200 to generate the instructions to the system described herein (i.e., G-Code) that may be used to control the printhead as well as the moving platform.

The computer software slices the input 3D model into a sequence of 2D layers (step 1202), which result in a plurality of polygons (step 1204). Then, the overhangs which need support are identified (step 1206). After the optimization of the position of the input 3D model relative to the printing platform, the computer software calculates the position and the length of metal beam sleeves for the required structural supports (step 1208). The computer software generates the residual printed support to be printed, if any (step 1210) and exports the related G-Code (step 1212) to the controller of the 3D printer (step 1214). Unlike conventional instructions for a 3D printer, commands are inserted between two neighboring layers to control the vertical movement of the moving platform. When the controller (e.g., controller 306) executes the inserted command, the moving platform will move up one layer distance.

Figure 12B:
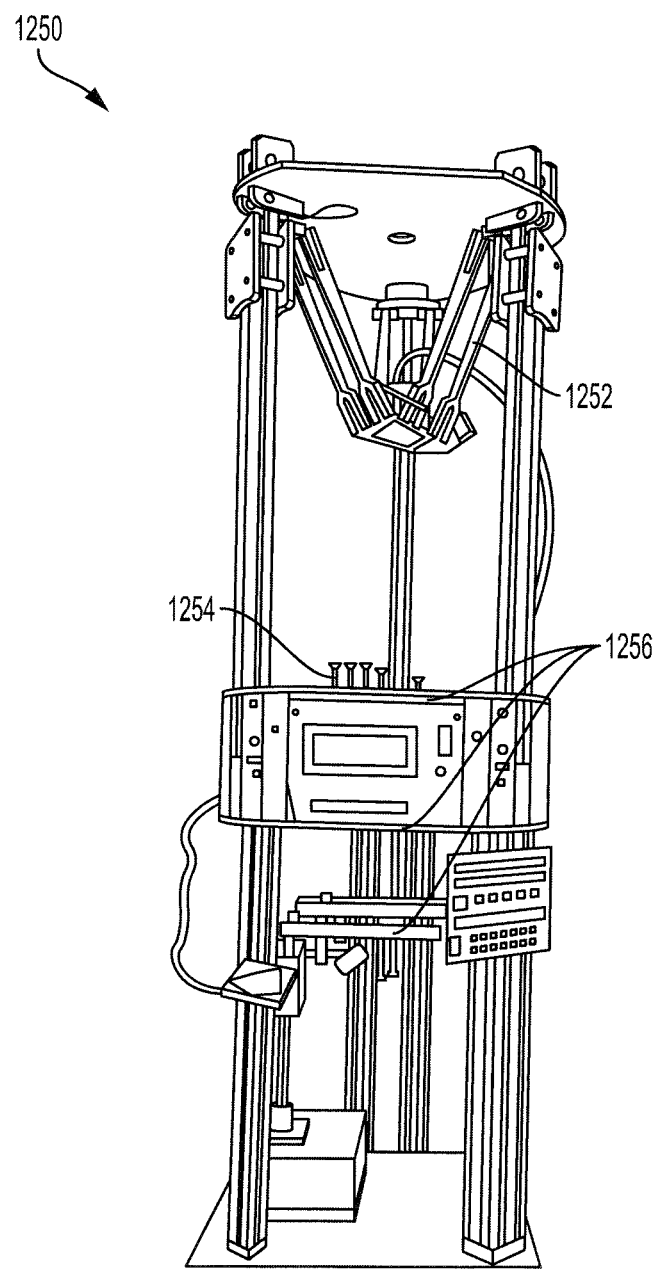
FIG. 12B illustrates an example system, according to embodiments of the invention.

FIG. 12B illustrates an example system 1250, according to embodiments of the invention. The system 1250 includes an FDM printer 1252 similar to the printer head 304 of FIG. 3, a plurality of elongated beams similar to elongated beams 110, and a three-layer structure similar to the first structural platform 104, the second structural platform 106, and the moving platform 108 described herein.

Although fused deposition modeling (FDM) has been used to illustrate the fabrication process of objects, the systems and methods described herein may be used with any number of different additive manufacturing processes, as will be described herein.

Figure 13:
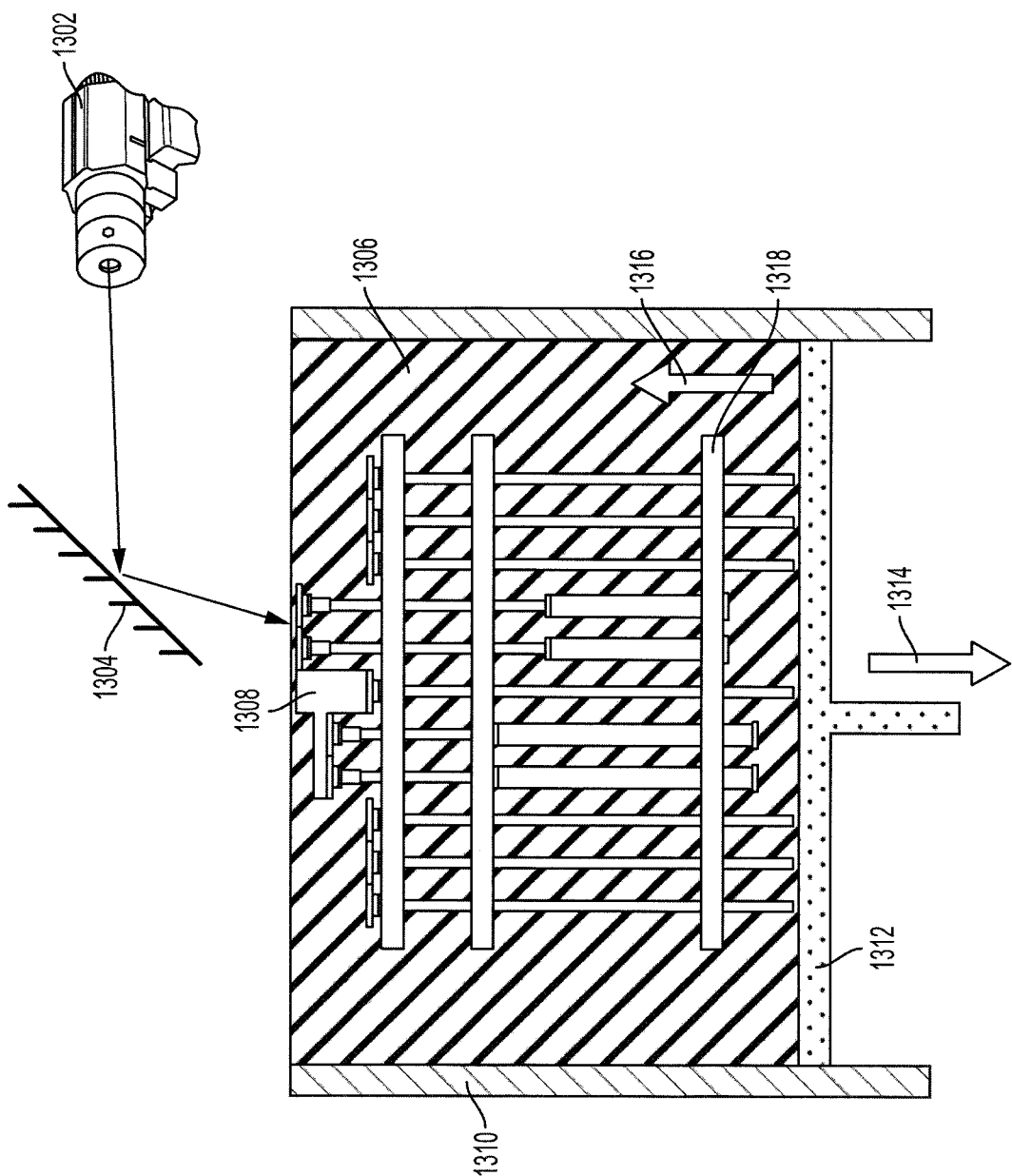
FIG. 13 illustrates the system being used with a powder-based selective laser sintering (SLS) or a powder-based selective laser melting (SLM) process, according to embodiments of the invention.

FIG. 13 illustrates use of the automatic reusable support system for 3D printing with a powder-based selective laser sintering (SLS) or a powder-based selective laser melting (SLM). In the powder-based SLS or SLM process, a laser 1302 is directed at a mirror 1304, which reflects the laser light toward a powder 1306. The laser light sinters or melts the powder 1306 and forms a solid object 1308.

The system and method of fabricating the object 1308 is similar to the system and method of fabricating the object 302 as illustrated in FIGS. 6A-6F. However, as illustrated in FIG. 13, the system is immersed in the powder 1306, as opposed to air, as in FIGS. 6A-6F. The powder 1306 is contained within a powder tank 1310. Similar to the process shown in FIGS. 6A-6F, the moving platform 1318 is the only platform that moves relative to the first structural platform and the second structural platform, and the moving platform 1318 moves upward 1316. However, in order to keep the system immersed in powder 1306, the bottom platform 1312 moves downward 1314 so that the object 1308, may be fabricated within the powder tank 1310. If the bottom platform 1312 did not move downward 1314, the object 1308 would protrude out of the powder tank 1310 and there would be no powder 1306 for the laser 1302 to sinter or melt to form the next layer of the object 1308. The elongated beams, beam sleeves, and magnets behave similarly to the elongated beams, beam sleeves, and magnets illustrated in FIGS. 6A-6F.

Figure 14:
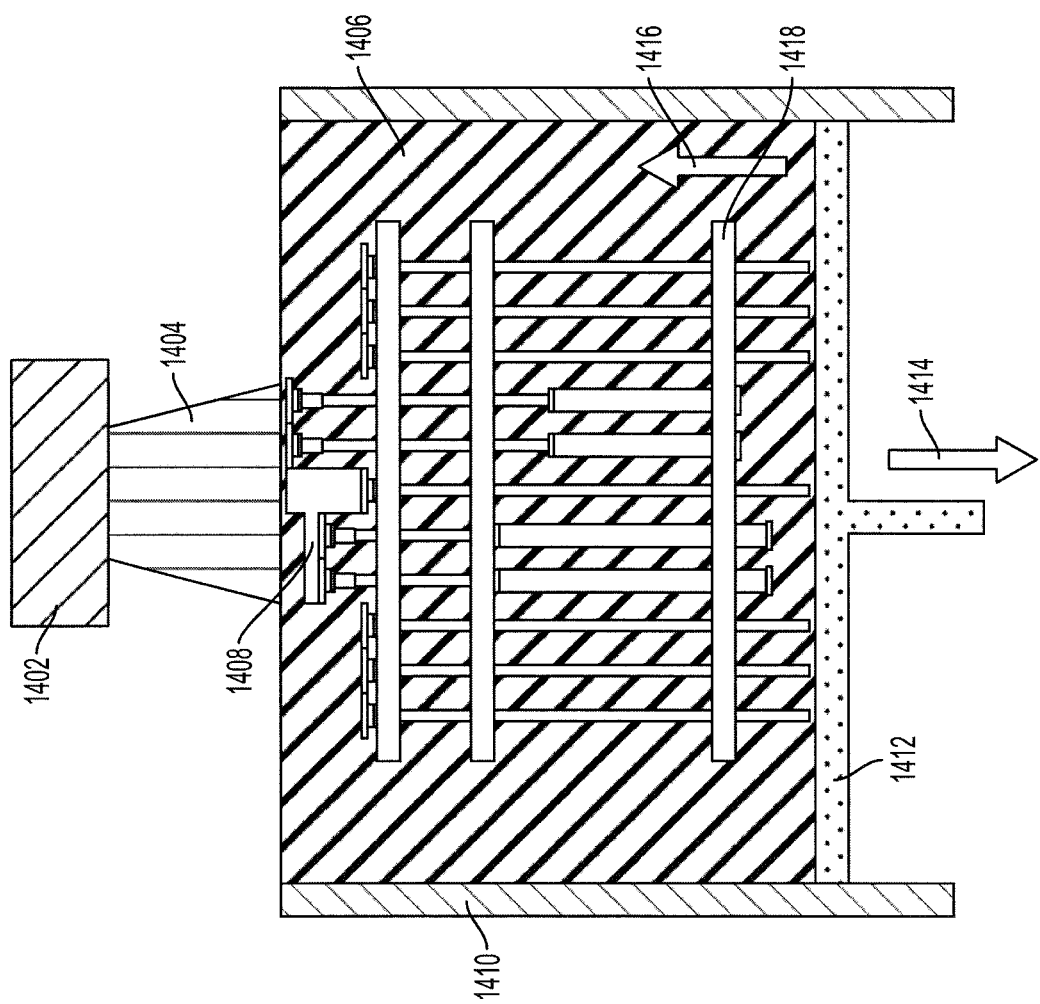
FIG. 14 illustrates the system being used with electron beam melting process, according to embodiments of the invention.

FIG. 14 illustrates use of the automatic reusable support system for 3D printing with powder-based electron beam melting (EBM). In a powder-based EBM process, an electron beam gun 1402 selectively and pointedly directs an electron beam 1404 toward a powder 1406. The electron beam 1404 melts the powder 1406 and forms a solid object 1408.

The system and method of fabricating the object 1408 is similar to the system and method of fabricating the object 302 as illustrated in FIGS. 6A-6F. However, as illustrated in FIG. 14, the system is immersed in the powder 1406, as opposed to air, as in FIGS. 6A-6F. The powder 1406 is contained within a powder tank 1410. Similar to the process shown in FIGS. 6A-6F, the moving platform 1418 is the only platform that moves relative to the first structural platform and the second structural platform, and the moving platform 1418 moves upward 1416. However, in order to keep the system immersed in powder 1406, the bottom platform 1412 moves downward so that the object 1408, may be fabricated within the powder tank 1410. If the bottom platform 1412 did not move downward, the object 1408 would protrude out of the powder tank 1410 and there would be no powder 1406 for the electron beam 1404 melt to form the next layer of the object 1408. The elongated beams, beam sleeves, and magnets behave similarly to the elongated beams, beam sleeves, and magnets illustrated in FIGS. 6A-6F.

Figure 15:
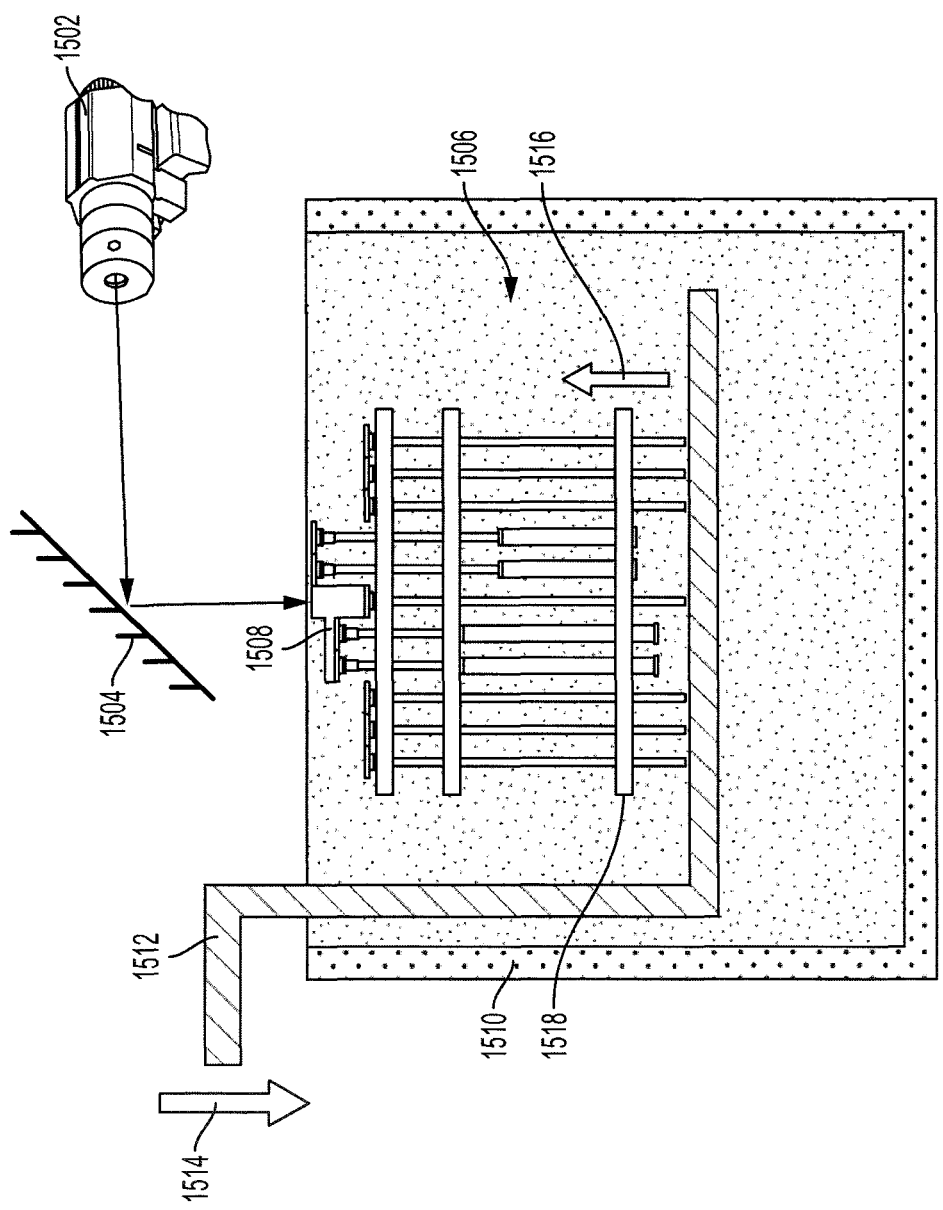
FIG. 15 illustrates the system being used with a top-down laser-based SLA process, according to embodiments of the invention.

FIG. 15 illustrates use of the automatic reusable support system for 3D printing with top-down liquid or paste based laser stereolithography (SLA). In a liquid or paste based laser SLA process, an ultraviolet laser 1502 emits an ultraviolet laser beam at a mirror 1504, which reflects the ultraviolet laser beam at a photocurable resin 1506 located within a resin tank 1510. The ultraviolet laser beam hardens the photocurable resin 1506 to form an object 1508.

The system and method of fabricating the object 1508 is similar to the system and method of fabricating the object 302 as illustrated in FIGS. 6A-6F. However, as illustrated in FIG. 15, the system is immersed in the photocurable resin 1506, as opposed to air, as in FIGS. 6A-6F. The photocurable resin 1506 is contained within the resin tank 1510. Similar to the process shown in FIGS. 6A-6F, the moving platform 1518 is the only platform that moves relative to the first structural platform and the second structural platform, and the moving platform 1518 moves upward 1516. However, in order to keep the system immersed in photocurable resin 1506, the base platform 1512 moves downward 1514 so that the object 1508, may be fabricated within the resin tank 1510. If the base platform 1512 did not move downward 1514, the object 1508 would protrude out of the resin tank 1510 and there would be no photocurable resin 1506 for the ultraviolet laser 1502 to harden to form the next layer of the object 1508. The elongated beams, beam sleeves, and magnets behave similarly to the elongated beams, beam sleeves, and magnets illustrated in FIGS. 6A-6F.

Figure 16:
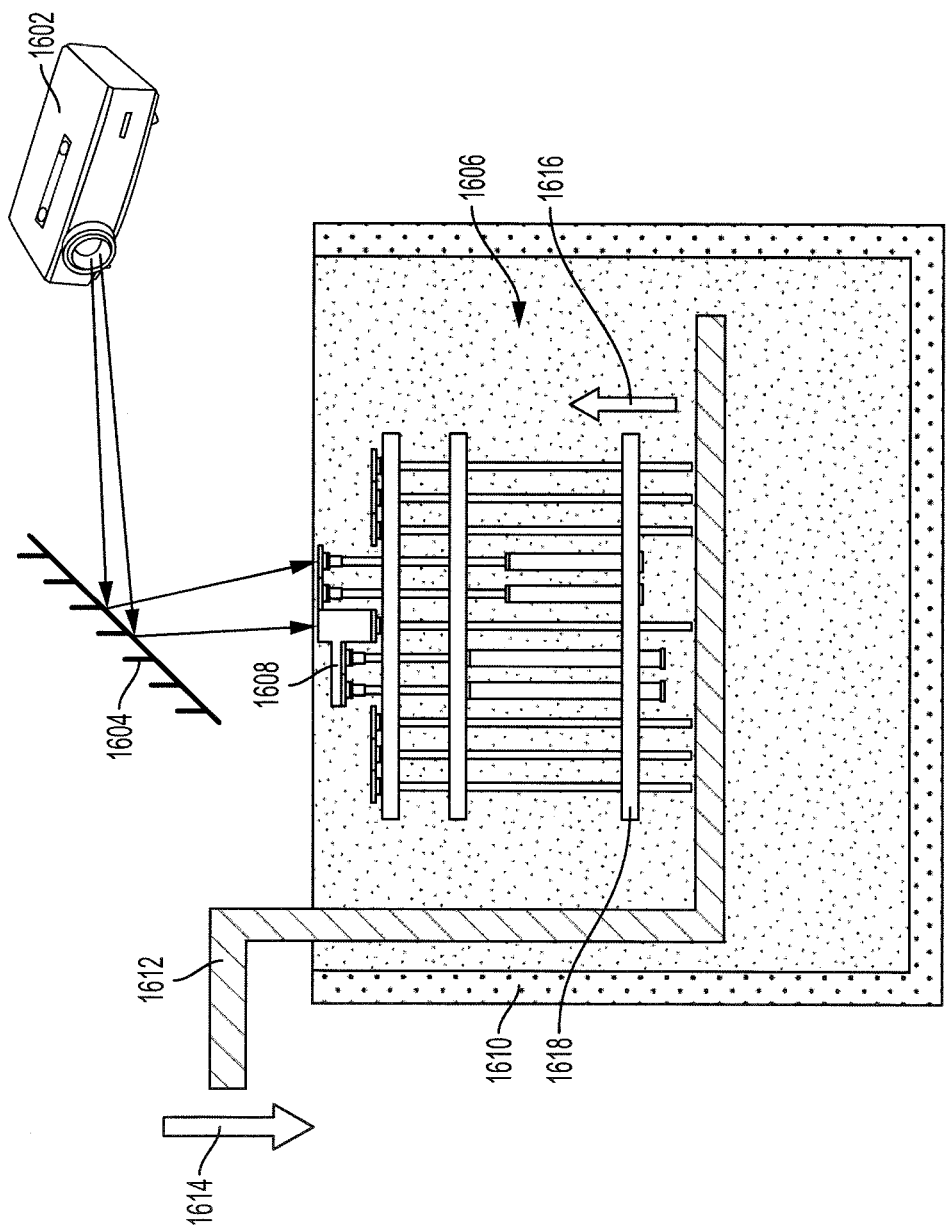
FIG. 16 illustrates the system being used with a top-down DLP-based SLA process, according to embodiments of the invention.

FIG. 16 illustrates use of the automatic reusable support system for 3D printing with top-down liquid or paste based projection stereolithography (SLA). In a liquid or paste based projection SLA process, a projector 1602 emits light at a mirror 1604, which reflects the light at a photocurable resin 1606 located within a resin tank 1610. The light hardens the photocurable resin 1606 to form an object 1608.

The system and method of fabricating the object 1608 is similar to the system and method of fabricating the object 302 as illustrated in FIGS. 6A-6F. However, as illustrated in FIG. 16, the system is immersed in the photocurable resin 1606, as opposed to air, as in FIGS. 6A-6F. The photocurable resin 1606 is contained within the resin tank 1610. Similar to the process shown in FIGS. 6A-6F, the moving platform 1618 is the only platform that moves relative to the first structural platform and the second structural platform, and the moving platform 1618 moves upward 1616. However, in order to keep the system immersed in photocurable resin 1606, the base platform 1612 moves downward 1614 so that the object 1608, may be fabricated within the resin tank 1610. If the base platform 1612 did not move downward 1614, the object 1608 would protrude out of the resin tank 1610 and there would be no photocurable resin 1606 for the light from the projector 1602 to harden to form the next layer of the object 1608. The elongated beams, beam sleeves, and magnets behave similarly to the elongated beams, beam sleeves, and magnets illustrated in FIGS. 6A-6F.

Figure 17:
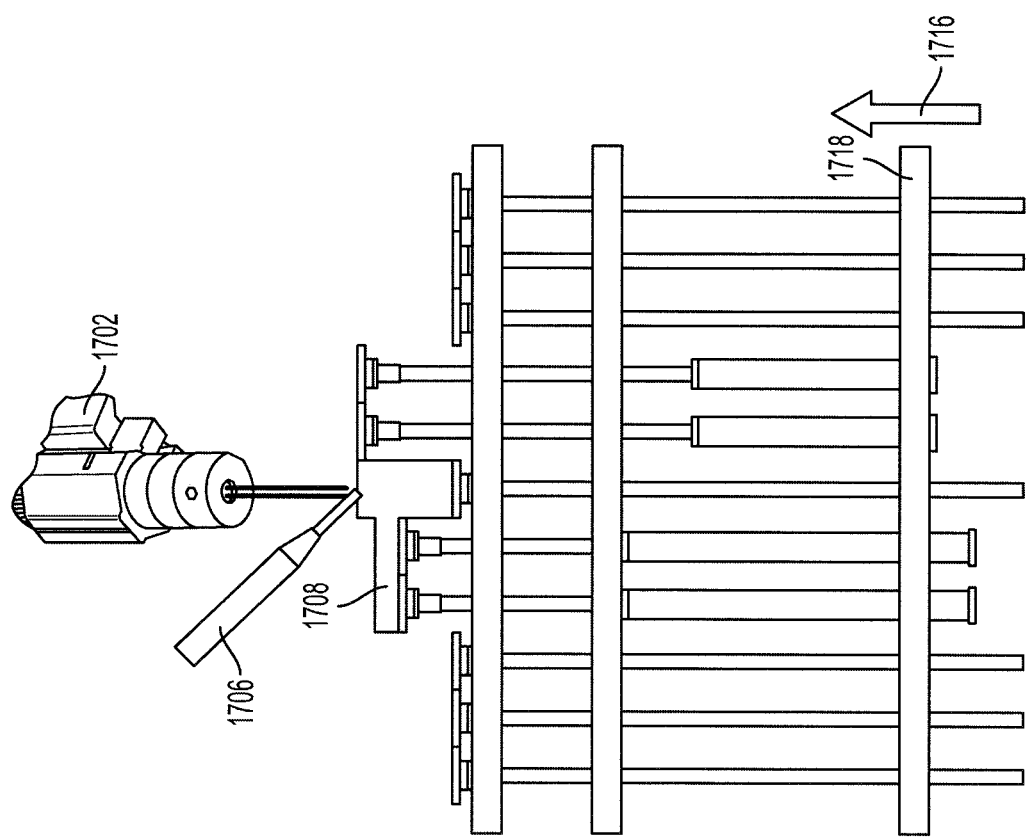
FIG. 17 illustrates the system being used with a material jetting 3D printing process, according to embodiments of the invention.

FIG. 17 illustrates use of the automatic reusable support system for 3D printing with jetting based multi-jet modeling (MJM). In a jetting based MJM process, a jetting printhead 1702 emits light toward the deposition surface and a material jet 1706 also emits ink, powder, or a paste toward the deposition surface. The light hardens the material emitted by the material jet 1706 to form an object 1708. The moving platform 1718 moves upward 1716, and the system and method of fabricating the object 1708 is otherwise similar to the system and method of fabricating the object 302 as illustrated in FIGS. 6A-6F.

FIG. 18 illustrates use of the automatic reusable support system for 3D printing with bottom-up liquid or paste based projection stereolithography (SLA). In a liquid or paste based projection SLA process, a projector 1802 emits light 1820 at a mirror 1804, which reflects the light 1820 at a photocurable resin 1806 located within a resin tank 1810. The light hardens the photocurable resin 1806 to form an object 1808.

The system and method of fabricating the object 1808 is similar to the system and method of fabricating the object 302 as illustrated in FIGS. 6A-6F. However, as illustrated in FIG. 18, the system is immersed in the photocurable resin 1806, as opposed to air, as in FIGS. 6A-6F, and additionally, the system is upside down, as compared to the process of FIGS. 6A-6F. The photocurable resin 1806 is contained within the resin tank 1810. Similar to the process shown in FIGS. 6A-6F, the third platform 1818 moves relative to the first platform and the second platform. However, as shown in FIG. 18, all three platforms 1814 move upward, and the third platform 1818 moves downward 1816, effectively rendering the third platform 1818 in a stationary position relative to the resin tank 1810 and the object 1808, but moving toward the first platform and the second platform. Accordingly, the third platform 1818 may be viewed as a structural platform and the first platform and the second platform may be viewed as moving platforms. The orchestrated movement of the components in this bottom-up configuration is further described in FIGS. 21A-21F.

The three platforms 1814 move in this configuration in order to keep the system immersed in photocurable resin 1806. If the first platform and the second platform did not move upward relative to the third platform 1818, there would be no additional room for the next layer of the object 1808 to be formed within the resin tank 1810.

FIG. 19 illustrates use of the automatic reusable support system for 3D printing with bottom-up liquid or paste based laser stereolithography (SLA). In a liquid or paste based laser SLA process, an ultraviolet laser 1902 emits an ultraviolet laser beam 1920 at a mirror 1904, which reflects the ultraviolet laser beam 1920 at a photocurable resin 1906 located within a resin tank 1910. The ultraviolet laser beam 1920 hardens the photocurable resin 1906 to form an object 1908.

The system and method of fabricating the object 1908 is similar to the system and method of fabricating the object 302 as illustrated in FIGS. 6A-6F. However, as illustrated in FIG. 19, the system is immersed in the photocurable resin 1906, as opposed to air, as in FIGS. 6A-6F, and additionally, the system is upside down, as compared to the process of FIGS. 6A-6F. The photocurable resin 1906 is contained within the resin tank 1910. Similar to the process shown in FIGS. 6A-6F, the third platform 1918 moves relative to the first platform and the second platform. However, as shown in FIG. 19, all three platforms 1914 move upward, and the third platform 1918 moves downward 1916, effectively rendering the third platform 1918 in a stationary position relative to the resin tank 1910 and the object 1908, but moving toward the first platform and the second platform. The orchestrated movement of the components in this bottom-up configuration is further described in FIGS. 21A-21F.

The three platforms 1914 move in this configuration in order to keep the system immersed in the photocurable resin 1906. If the first platform and the second platform did not move upward relative to the third platform 1918, there would be no additional room for the next layer of the object 1908 to be formed within the resin tank 1910.

FIG. 20 illustrates elements of the automatic reusable support system for 3D printing when used in a bottom-up configuration. Elements shown in FIG. 20 are similar to elements shown in FIG. 4, but oriented differently. The elongated beam 2010 is connected at one end to a magnetic ring 2004. The magnetic ring 2004 may be configured to surround and house one end of the elongated beam 2010. The magnetic ring 2004 may connect to a magnetic disc 2002, which may be removably coupled to the platform segment 2001. In some situations, the platform segment 2001 may be removed from the magnetic disc 2002 when fabrication of the object is completed and the object may be stuck to the platform segment 2001.

FIGS. 21A-21F illustrate a process of fabricating an object using the automatic reusable support system for 3D printing in a bottom-up configuration. The process shown in FIGS. 21A-21F is used with the bottom-up liquid or paste based projection stereolithography of FIG. 18 and/or the bottom-up liquid or paste based laser stereolithography of FIG. 19. In both situations, a light 2124 is emitted toward a deposition surface and hardens a resin. The process shown in FIGS. 21A-21F is similar to the process shown in FIGS. 6A-6F, with the difference being the orientation of the elements and immersion of the elements within resin.

As described herein, the system includes a deposition surface made of a matrix of platform segments 2001. The platform segments 2001 are connected to elongated beams 2010 via a magnetic ring 2004 and a magnetic disc 2002. The elongated beam 2010 runs through the first platform 2150, the second platform 2152, and the third platform 2154. Some of the elongated beams 2010 are surrounded by a beam sleeve 2132 having a magnetic ring 2136 connected to the bottom side and a magnetic disc 2134 connected to the top side.

Figure 21D:
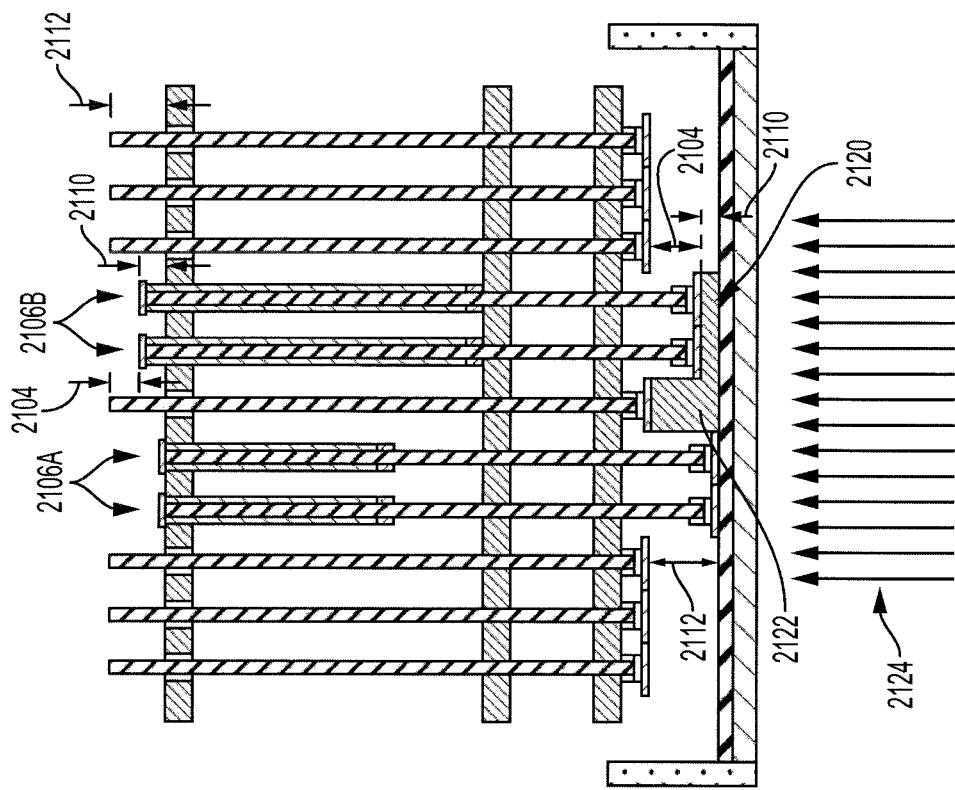

FIGS. 21A-21F illustrate the movements of two pairs of movable support columns 2106A and 2106B. In FIG. 21A, both the first pair of movable support columns 2106A and the second pair of movable support columns 2106B begin in an unextended state, with the third platform 2154 near the tops of the elongated beams 2010 and the deposition surface being substantially flat and even.

In FIG. 21B, the first platform 2150 and the second platform 2152 move upward, toward the third platform 2154, by a first distance 2102. The third platform 2154 remains in a stationary position relative to the object 2122. Thus, the third platform 2154 may be viewed as a structural platform and the first platform 2150 and the second platform 2152 may be viewed as moving platforms. Before, during, or after this movement, the light 2124 has caused the resin to form a layer of the object 2122. The first distance 2102 may correspond to a height of each layer formed on the object 2122. When the first platform 2150 and the second platform 2152 move upward, the elongated beams 2010 that are not surrounded by beam sleeves 2132 also move upward because of the magnetic force between the top surface of the magnetic rings 2004 of the elongated beams 2010 and the bottom surface of the first platform 2150.

The first pair of movable support columns 2106A and the second pair of movable support columns 2106B do not move upward because the magnetic force between the bottom surface of the magnetic disc 2134 and the top surface of the third platform 2154 is greater than the magnetic force between the top surface of the magnetic rings 2004 of the elongated beams 2010 and the bottom surface of the first platform 2150. As a result, when the first platform 2150 and the second platform 2152 move upward by the first distance 2102, the platform segments corresponding to the first pair of movable support columns 2106A and the second pair of movable support columns 2106B do not move upward. Instead, all of the other elongated beams 2010 move upward, and the object 2122 is formed.

Figure 21C:
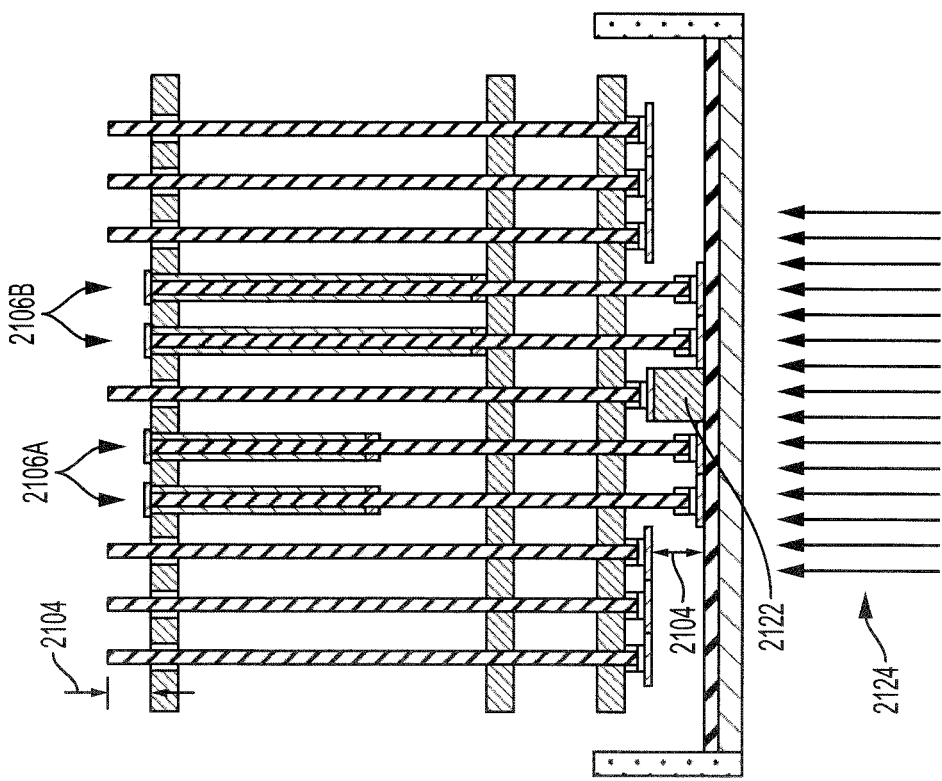

In FIG. 21C, the first platform 2150 and the second platform 2152 proceed with moving upward. At this point, the first platform 2150 and the second platform 2152 have moved upward by a second distance 2104. Before, during, or after this movement, the light 2124 has caused the resin to form another layer of the object 2122 to further fabricate the object 2122. The difference between the second distance 2104 and the first distance 2102 may correspond to a height of each layer deposited onto the object 2122. The platform segments corresponding to the first pair of movable support columns 2106A and the second pair of movable support columns 2106B have still not moved upward, but the remaining elongated beams 2010 have continued to move upward, as they remain connected to the first platform 2150.

The second platform 2152 has moved upward to the point where the magnetic rings 2136 on the bottom end of the beam sleeves 2132 of the second pair of movable support columns 2106B are contacting the top surface of the second platform 106.

In FIG. 21D, the first platform 2150 and the second platform 2152 further proceed with moving upward. At this point, the first platform 2150 and the second platform 2152 have moved upward by a third distance 2112. Before, during, or after this movement, the light 2124 has caused the resin to form another layer of the object 2122 to further fabricate the object 2122. The difference between the third distance 2112 and the second distance 2104 may correspond to a height of each layer deposited onto the object 2122. As described herein, the opening of the second platform 2152 does not allow the beam sleeve 2132 to pass through. As a result, the magnetic discs 2134 of the second pair of movable support columns 2106B are released from the top surface of the third platform 2154, but remain attached to the second platform 2152 via the magnetic rings 2136. Accordingly, the second pair of movable support columns 2106B now begin to move upward as the first platform 2150 and the second platform 2152 move upward, and the platform segments of the second pair of movable support columns 2106B are moved by only the difference 2110 between the third distance 2112 and the second distance 2104. By contrast, the first pair of movable support columns 2106A remain stationary.

As a result of the second pair of movable support columns 2106B being able to move upward, an overhang 2120 of the object 2122 is capable of being fabricated without fabricating a support structure.

FIGS. 21E and 21F show the further steps of the process of fabricating the object 2122 without use of fabricated support structures. As can be seen from the resulting object 2122 shown in FIG. 21F, an object having multiple overhangs can be fabricated without using fabricated support structures.

The beam sleeves 2132 have a predefined length, and the beam sleeves used in the system when an object is fabricated may be changed based on the geometry of the object to be fabricated. The beam sleeves may receive any of the elongated beams 2010, and may be removably coupled to the elongated beams 2010 using magnets, adhesive, or an interference fit, for example.

Upon completion of the fabrication of the object 2122, the first platform 2150 and the second platform 2152 are moved downward to their original position. The elongated beams 2010 may be removed from the object 2122 and may be reused, along with the beam sleeves 2132 and every other element of the system.

Figure 22:
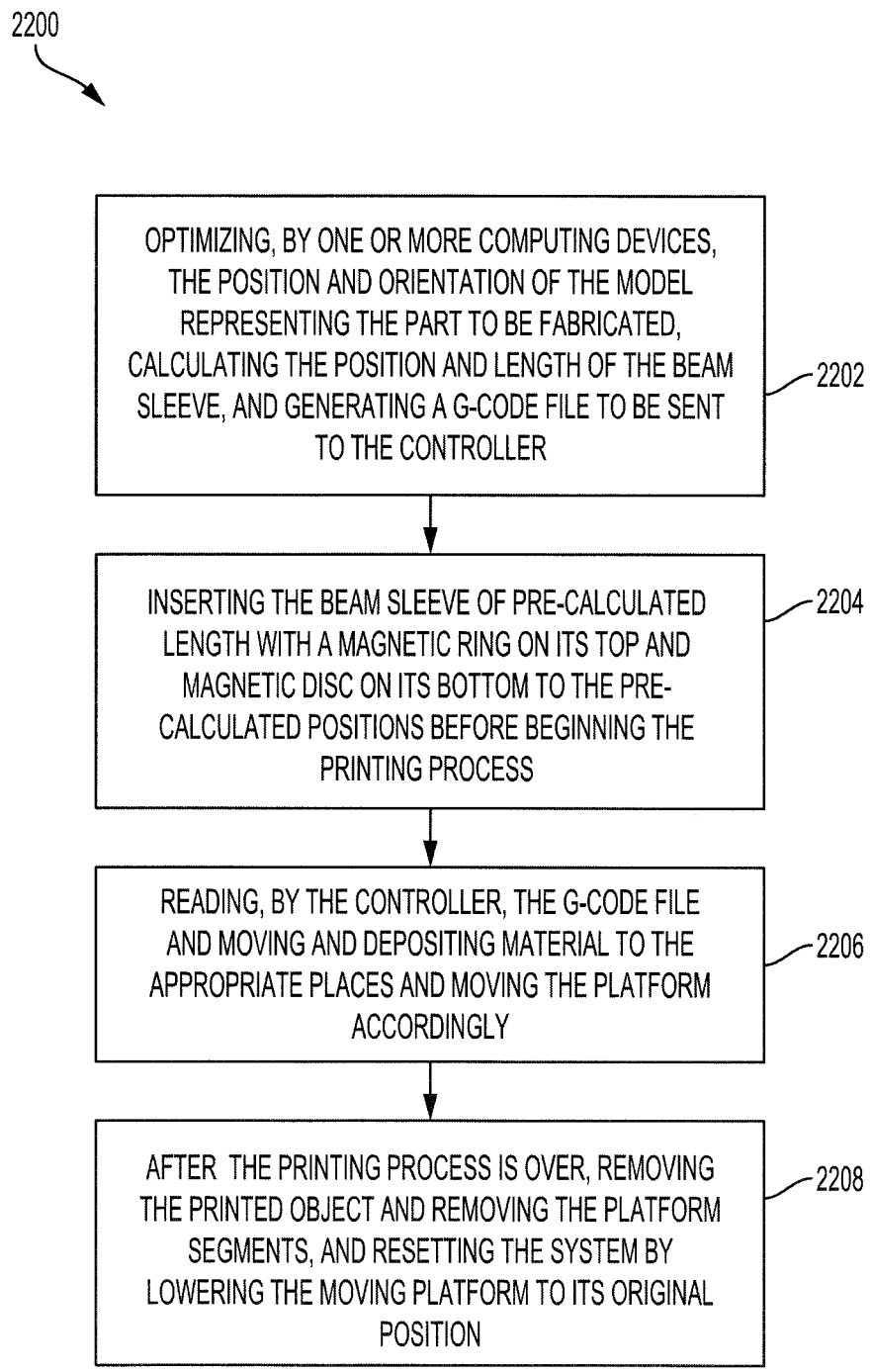
FIG. 22 illustrates a flow diagram of a process used by the system, according to embodiments of the invention.

FIG. 22 illustrates a flowchart of a process 2200 for providing structural support for an overhang feature of an object fabricated using an additive manufacturing process.

The specially developed software optimizes the position and orientation of the model representing the part to be fabricated, calculates the position and the length of the beam sleeve 112, and generates a G-Code file to be sent to the controller 306 (step 2202). As described herein, the specially developed software, running on a computing device, may be configured to perform determinations faster and more accurately than human beings are capable of, and therefore, they improve the existing computer technology of additive manufacturing.

The beam sleeves of pre-calculated length with magnetic ring on its top and magnetic disc on its bottom is inserted to the pre-calculated positions before beginning the printing process (step 2204). In some embodiments, the beam sleeves are manually placed in their appropriate positions. In some embodiments, the beam sleeves are automatically placed in their appropriate positions using articulating arms.

The printing process is begun. The controller 306 will read the G-Code file and deposit material to the right places and move the platform 108 accordingly (step 2206).

After the printing process is over, the printed object is removed and the platform segments which attach to the part surface may be peeled off. The 3D printer is reset by lowering the moving platform 108 to its original place prior to the printing job. This can be done by the controller 306 automatically. Finally, the peeled platform segments are placed back on the printing platform or the deposition surface. Now the apparatus is ready for a new printing job (step 2208).

References to "various embodiments," in "some embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments The foregoing description of the disclosed example embodiments is provided to enable any person of ordinary skill in the art to make or use the present invention. Various modifications to these examples will be readily apparent to those of ordinary skill in the art, and the principles disclosed herein may be applied to other examples without departing from the spirit or scope of the present invention. The described embodiments are to be considered in all respects only as illustrative and not restrictive and the scope of the invention is, therefore, indicated by the following claims rather than by the foregoing description. All changes which come within the meaning and range of equivalency of the claims are to be embraced within their scope.

What is claimed is:

1. A method for providing structural support for an overhang feature of an object fabricated using an additive manufacturing process, the method comprising:
    providing a deposition surface for the object to be fabricated, the deposition surface located on a plurality of platform segments collectively forming a printing platform;
    providing a structural platform adjacent the printing platform and spaced away from the printing platform on an opposite side of the printing platform relative to the deposition surface;
    determining, using one or more computing devices, a position and an orientation of a model representing the object to be fabricated;
    determining, using the one or more computing devices, a series of vertical movement steps including a position and a degree of vertical movement for one or more elongated beams to be moved during the fabrication of the object, the one or more elongated beams extending through corresponding openings in the structural platform and toward the deposition surface, each of the one or more elongated beams being connected to a respective platform segment from the plurality of platform segments collectively forming the printing platform; and
    automatically controlling vertical movement of each of the one or more elongated beams during fabrication of the object based on the determined series of fabrication steps, the one or more elongated beams providing the structural support for the overhang,
    wherein each elongated beam of the one or more elongated beams is each received by and connected to a corresponding beam sleeve,
    wherein a maximum extent of the vertical movement of each of the one or more elongated beams is limited by the corresponding beam sleeve of the each of the one or more elongated beams contacting the structural platform adjacent the printing platform.

2. The method of claim 1, wherein the automatic controlling of the vertical movement of each of the one or more elongated beams comprises controlling movement of a moving platform connected to the one or more elongated beams.

3. The method of claim 2, wherein the controlling of the movement of the moving platform comprises moving the moving platform in increments corresponding to a height of each layer of the object.

4. The method of claim 2, wherein the contacting the structural platform by the beam sleeve causes the corresponding elongated beam to disconnect from the moving platform at a position of the maximum extent of the vertical movement.

5. The method of claim 4, wherein the one or more elongated beams is selectably connectable to the moving platform by a magnet of the beam sleeve.

6. The method of claim 4, wherein the one or more elongated beams is selectably connectable to the moving platform by a magnet of the one or more elongated beams.

7. The method of claim 1, further comprising additively manufacturing the overhang feature of the object fabricated using the additive manufacturing process by depositing the overhang feature on the deposition surface by a fused deposition modeling printer head.

8. The method of claim 1, further comprising additively manufacturing the overhang feature of the object fabricated using the additive manufacturing process by depositing the overhang feature on the deposition surface by a laser or a projector for performing stereolithography using a resin.

9. The method of claim 1, further comprising additively manufacturing the overhang feature of the object fabricated using the additive manufacturing process by depositing the overhang feature on the deposition surface by an electron beam for performing electron beam sintering using a powder.

10. The method of claim 1, further comprising additively manufacturing the overhang feature of the object fabricated using the additive manufacturing process by depositing the overhang feature on the deposition surface by a laser for performing selective laser sintering or selective laser melting using a powder.

11. The method of claim 1, further comprising additively manufacturing the overhang feature of the object fabricated using the additive manufacturing process by depositing the overhang feature on the deposition surface by a jetting printer head and a material jet for performing multi jet modeling.

12. A method for providing structural support for an overhang feature of an object fabricated using an additive manufacturing process, the method comprising:
  providing a deposition surface for the object to be fabricated, the deposition surface located on a plurality of platform segments collectively forming a printing platform, the plurality of platform segments including a first platform segment and a second platform segment;
  providing a structural platform adjacent the printing platform and spaced away from the printing platform on an opposite side of the printing platform relative to the deposition surface;
  determining, using one or more computing devices, a position and an orientation of a model representing the object to be fabricated;
  determining, using the one or more computing devices, a series of vertical movement steps including a position and a degree of vertical movement for a first elongated beam associated with the first platform segment and a second elongated beam associated with the second platform segment to be moved during the fabrication of the object, the first elongated beam extending though a first opening in the structural platform and toward the deposition surface and the second elongated beam extending through a second opening in the structural platform and toward the deposition surface; and
  providing a moving platform connected to the first elongated beam and the second elongated beam;
  automatically controlling vertical movement of the moving platform to automatically control vertical movement of first elongated beam and the second elongated beam during fabrication of the object based on the determined series of fabrication steps, the one or more elongated beams providing the structural support for the overhang;
  providing a first beam sleeve of the first elongated beam, wherein the first elongated beam is received by and connected to the first beam sleeve; and
  providing a second beam sleeve of the second elongated beam, wherein the second elongated beam is received by and connected to the second beam sleeve,
  wherein a first maximum extent of the vertical movement of the first elongate beam is limited by the first beam sleeve of the first elongate beam contacting the structural platform adjacent the printing platform,
  wherein a second maximum extent of the vertical movement of the second elongate beam is limited by the second beam sleeve of the second elongate beam contacting the structural platform adjacent the printing platform.

13. The method according to claim 12, wherein the first beam sleeve is longer than the second beam sleeve so that the first maximum extent of the vertical movement is less than the second maximum extent of the vertical movement.

14. The method according to claim 12, wherein the first elongate beam is selectably connectable to the moving platform by a magnet of the first beam sleeve and selectably disconnects from the moving platform upon the moving platform achieving the first maximum extent of the vertical movement and before achieving the second maximum extent of the vertical movement.

* * * * *